(12) United States Patent
Burton et al.

(10) Patent No.: US 7,107,359 B1
(45) Date of Patent: Sep. 12, 2006

(54) HOST-FABRIC ADAPTER HAVING HARDWARE ASSIST ARCHITECTURE AND METHOD OF CONNECTING A HOST SYSTEM TO A CHANNEL-BASED SWITCHED FABRIC IN A DATA NETWORK

(75) Inventors: Tom E. Burton, Beaverton, OR (US); Dominic J. Gasbarro, Forest Grove, OR (US); Brian M. Leitner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1133 days.

(21) Appl. No.: 09/698,188

(22) Filed: Oct. 30, 2000

(51) Int. Cl.
*G06F 15/16* (2006.01)
*G06F 15/76* (2006.01)
*H04L 12/66* (2006.01)
*G06F 13/14* (2006.01)

(52) U.S. Cl. .................. 709/250; 712/34; 712/36; 370/463; 710/305

(58) Field of Classification Search ............... 709/250; 370/463; 712/36, 34; 710/305, 310, 311
See application file for complete search history.

(56) References Cited

U.S. PATENT DOCUMENTS

| | | |
|---|---|---|
| 5,367,643 A | 11/1994 | Chang et al. |
| 5,634,015 A | 5/1997 | Chang et al. |
| 6,188,690 B1 | 2/2001 | Holden et al. |
| 6,243,787 B1 | 6/2001 | Kagan et al. |
| 6,400,730 B1 | 6/2002 | Latif et al. |
| 6,421,711 B1 | 7/2002 | Blumenau et al. |
| 6,545,981 B1 | 4/2003 | Garcia et al. |
| 6,557,060 B1 | 4/2003 | Haren |
| 6,591,310 B1 | 7/2003 | Johnson |
| 6,594,701 B1 | 7/2003 | Forin |
| 6,611,879 B1 | 8/2003 | Dobecki |
| 6,628,609 B1 | 9/2003 | Chapman et al. |
| 6,668,299 B1 | 12/2003 | Kagan et al. |
| 6,678,782 B1 | 1/2004 | Aydemir et al. |
| 6,690,757 B1 | 2/2004 | Bunton et al. |
| 6,691,198 B1 | 2/2004 | Hamlin |
| 6,694,392 B1 | 2/2004 | Haren |

(Continued)

OTHER PUBLICATIONS

NGIO Forum, Next Generation I/O Link Architecture Specification: HCA Specification, pp. 1-58, Jul. 20, 1999.*

(Continued)

*Primary Examiner*—Larry D. Donaghue
(74) *Attorney, Agent, or Firm*—Schwegman, Lundberg, Woessner & Kluth, P.A.

(57) ABSTRACT

A host system is provided with one or more host-fabric adapters installed therein for connecting to a switched fabric of a data network. The host-fabric adapter may comprise a Micro-Engine (ME) arranged to establish connections and support data transfers via a switched fabric; a serial interface arranged to receive and transmit data packets from the switched fabric for data transfers; a host interface arranged to receive and transmit host data transfer requests, in the form of descriptors, from the host system for data transfers; a Receiver Header Hardware Assist (HWA) Mechanism configured to check header information of incoming data packets host descriptors for header errors so as to offload the Micro-Engine (ME) from having to check for header errors; and a Transmitter Header Hardware Assist (HWA) Mechanism configured to generate OpCode and Length fields for an outgoing data packet when an entire data packet is being assembled for transmission, via the serial interface, so as to offload the Micro-Engine (ME) from having to build all data packets for data transfers.

43 Claims, 21 Drawing Sheets

U.S. PATENT DOCUMENTS

| | | | |
|---|---|---|---|
| 6,751,238 | B1 | 6/2004 | Lipp et al. |
| 6,775,719 | B1* | 8/2004 | Leitner et al. ................. 710/33 |
| 6,778,548 | B1* | 8/2004 | Burton et al. ................ 370/429 |
| 6,831,916 | B1* | 12/2004 | Parthasarathy et al. ..... 370/359 |
| 6,859,867 | B1 | 2/2005 | Berry |
| 6,889,380 | B1 | 5/2005 | Shah |
| 6,937,611 | B1* | 8/2005 | Ward .......................... 370/462 |
| 2001/0053148 | A1 | 12/2001 | Billic et al. |
| 2002/0071450 | A1* | 6/2002 | Gasbarro et al. ........... 370/463 |
| 2003/0070014 | A1 | 4/2003 | Haren |
| 2003/0091037 | A1* | 5/2003 | Latif et al. .................. 370/355 |

OTHER PUBLICATIONS

Compaq Computer Corp. et al, Virtual Interface Architecture Specifications, pp. 1-83, Dec. 16, 1997.*

InfiniBand Trade Association, InfiniBand(TM) Architecture Specification vol. 1 Release 1.0, pp. 1-880, Oct. 24, 2000.*

InfiniBand Trade Association, InfiniBand(TM) Architecture Specification vol. 3 Release 0/9 Application of Infiniband, pp. 1-233, Sep. 29, 2000.*

InfiniBand Trade Association, InfiniBand(TM) Architecture Specification vol. 2 Release 1.0, pp. 1-880, Oct. 24, 2000.*

Buonadonna et al., An Implementation and Analysis of Virtual Interface Architecture, pp. 1-19, IEEE 1998.*

Patel et al. A Model of Completion Queue Mechanisms using the Virtual Interface API, 2000, IEEE, pp. 280-288.*

Cole et al. , High Speed Digital Transceivers: A Challenge for Manufacturing, pp. 211-215, IEEE.*

Dunning et al. The Virtual Interface Architecture Interface IEEE, pp. 66-76, 1998.*

Garcia et al. Future I/O, pp. 1-5, IEEE Oct. 1999.*

Mahon et al. Hewlett-Packard Precision Architecture: The Processor, pp. 4-22, Aug. 1986.*

An Analysis of VI Architecture Primitives in Support of parallell and Disrtibuted Communications, pp. 1-12, Apr. 2000.*

Torres, D. , et al., "A new bus assignment in a designed shared bus switch fabric", *Proceedings of the 1999 IEEE International Symposium on Circuits and Systems, ISCAS '99*, vol. 1, (1999), 423-426.

* cited by examiner

EXAMPLE SOFTWARE DRIVER STACKS OF HOST SYSTEM

HOST-FABRIC ADAPTER HAVING HARDWARE ASSIST ARCHITECTURE AND METHOD OF CONNECTING A HOST SYSTEM TO A CHANNEL-BASED SWITCHED FABRIC IN A DATA NETWORK

TECHNICAL FIELD

The present invention relates to a data network, and more particularly, relates to a host-fabric adapter having hardware assist architecture and a method of connecting a host system to a channel-based switched fabric in such a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices via a data network. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corporation to provide a standards-based I/O platform that uses a switched fabric and separate I/O channels instead of a shared memory-mapped bus architecture for reliable data transfers between end-nodes in a data network, as set forth in the "*Next Generation Input/Output (NGIO) Specification*," NGIO Forum on Jul. 20, 1999 and the "*InfiniBand™ Architecture Specification*," the InfiniBand™ Trade Association scheduled for publication in late October 2000. Using NGIO/InfiniBand™, a host system may communicate with one or more remote systems using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain work queues (WQ) formed in pairs including inbound and outbound queues in which requests, in the form of descriptors, are posted to describe data movement operation and location of data to be moved for processing and/or transportation via a data network. Each host system may serve as a source (initiator) system which initiates a message data transfer (message send operation) or a target system of a message passing operation (message receive operation). Requests for work (data movement operations such as send/receive operations and remote direct memory access "RDMA" read/write operations) may be posted to work queues associated with a given network interface card. One or more channels between communication devices at host systems via a data network may be created and managed so that requested operations can be performed.

Since NGIO/InfiniBand™ is an emerging interconnect technology not yet in the marketplace, there is no known interface mechanism specifically implemented for NGIO/InfiniBand™ applications. More specifically, there is no known network interface card for a host system to connect to a data network using a channel-based, switched fabric architecture to support data movement operations between communication devices at a host system or between host systems or via a data network. Existing network interface cards for host systems are not adapted for emerging NGIO/InfiniBand™ interconnect technology and are, therefore, not optimized for NGIO/InfiniBand™ functionality.

Accordingly, there is a need for an especially designed, performance-driven host-fabric adapter having hardware assist architecture installed at a host system in a data network using a channel-based, switched fabric architecture, and optimized for NGIO/InfiniBand™ functionality, including controlling execution of NGIO/InfiniBand™ protocols with minimal pipelining and NGIO/InfiniBand™ data cell/packet processing with minimal latency.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric to architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
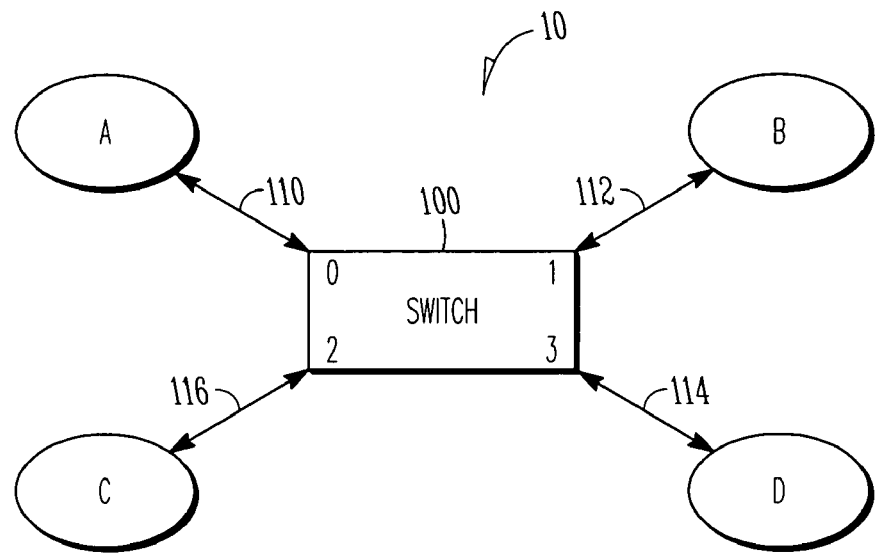
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association scheduled for publication in late October 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999, and/or the *InfiniBand™ Specification* for enabling the endpoints (nodes) to communicate to each other over an NGIO/InfiniBand™ channel(s) with minimum data transfer rates of up to 2.5 gigabit per second (Gbps), for example.

Figure 2:
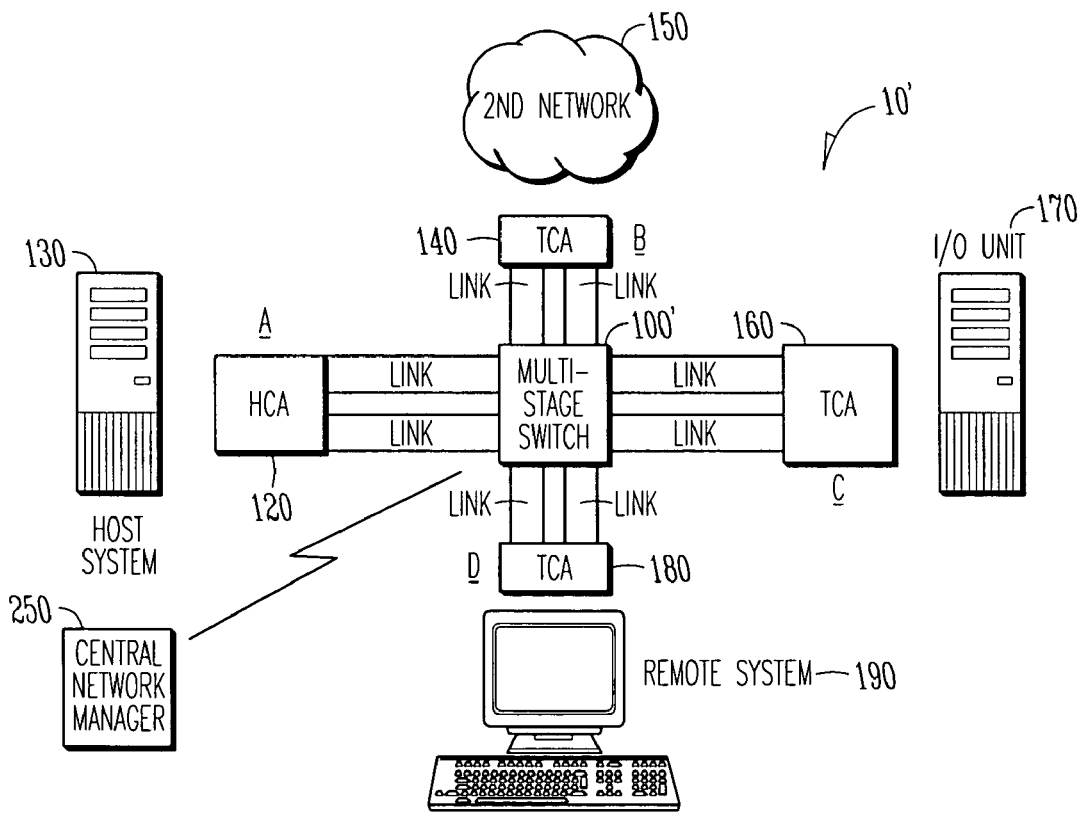
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of cells between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBand-ta.org."

Figure 3A:
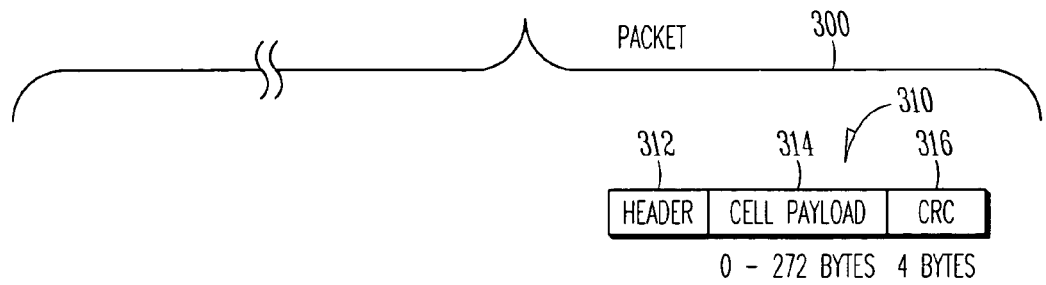
FIGS. 3A–3D illustrate packet and cell formats of data transmitted from a source node to a destination node and descriptors posted in an example data network according to an embodiment of the present invention.
Figure 3B:
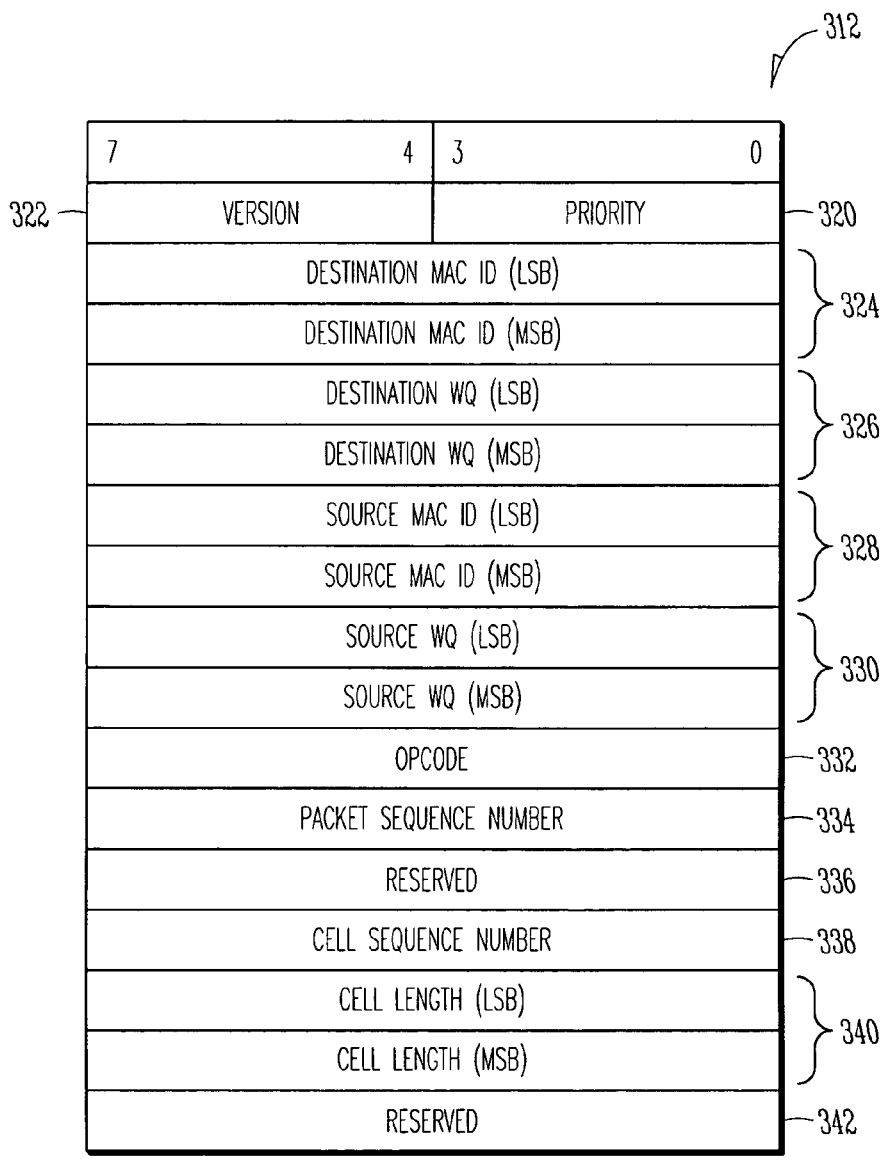

FIGS. 3A–3B illustrate an embodiment of packet and cell formats of message data transmitted from a source node (data transmitter) to a destination node (data receiver) through switches and/or intermediate nodes according to the "*Next Generation I/O Link Architecture Specification*" as set forth by the NGIO Forum on Mar. 26, 1999. As shown in FIG. 3A, a data packet 300 may represent a sequence of one or more data cells 310 (typically derived from the data transfer size defined by a descriptor). Each cell 310 may include a fixed format header information 312, a variable format cell payload 314 and a cyclic redundancy check (CRC) information 316. Under the "*InfiniBand™ Architecture Specification*" as set forth by the InfiniBand™ Trade Association, the same data cells may be referred to as data packets having similar header information as the least common denominator (LCD) of message data. However, InfiniBand™ header information may be more inclusive than NGIO header information. Nevertheless, for purposes of this disclosure, data cells are described hereinbelow but are interchangeable with data packets via InfiniBand™ protocols.

The header information 312 according to the NGIO specification may consist of 16-byte media control access (MAC) header information which specifies cell formation, format and validation and different types of headers, for example, routing header and transport header. Transport header may be extended to include additional transport fields, such as Virtual Address (VA) (not shown) and Memory Handle (MH) (not shown) for remote direct memory access (RDMA) operations (e.g., read and write operations). Rather than physical addresses, Virtual Address (VA) and Memory Handle (MH) are employed not only by data cells/packets but also by NGIO/InfiniBand™ descriptors to address host memory 206 of the host system 130.

For example, such MAC header information 312 may include, as shown in FIG. 3B, a Priority field 320, a Version field 322, a Destination Address field 324, a Destination VI field 326, a Source Address field 328, a Source VI field 330, an OpCode field 332, a Packet Sequence Number (PSN) field 334, a Cell Sequence Number (CSN) field 338, a cell Length field 340 and several reserved fields 336 and 342 provided for future usage.

The Priority field 320 may contain 4-bits of information which indicates the priority of an incoming cell associated with a given VI. The Version field 322 may contain another 4-bits of information which indicates the version number of incoming cells. The Destination Address field 324 may contain 2-bytes of information (including the least significant bits [LSB] and most significant bits [MSB]) which provides the MAC address to which the cell is destined. The Destination VI field 326 may contain 2-bytes of information (including the least significant bits [LSB] and most significant bits [MSB]) which provides the Virtual Interface (VI) number on the remote device receiving the cell. The Source Address field 328 may contain 2-bytes of information (including the least significant bits [LSB] and most significant bits [MSB]) which provides the MAC address assigned to the specific port of the host-fabric adapter that is transmitting the cell. The Source VI field 330 may contain 2-bytes of information (including the least significant bits [LSB] and most significant bits [MSB]) which provides the Virtual Interface (VI) number the host-fabric adapter used to create the cell. The OpCode field 332 may contain 8-bits of information which identifies the transaction type associated with the cell. The Packet Sequence Number (PSN) field 334 may contain 8-bits of information which provides an incrementing Packet Sequence Number (PSN) used to keep track of the ordering of data packets as the data packets are sent or received. Since the PSN is an 8-bit value ($2^8$), there may be 256 possible combinations. The PSN may start at zero for the first packet transmitted on each VI and roll over again to zero after transmitting 256 packets in order to allow the target device to identify packets that were lost while crossing the switched fabric 100' and inform the source device as to which packet(s) were lost. The Cell Sequence Number (CSN) field 338 may contain 8-bits of information which provides an incrementing Cell Sequence Number. The CSN may also start at zero in the first cell of each packet and roll over again to zero after 256 cells from a given packet have transpired in order to allow the target device to identify lost cells. The Cell Length field 340 may contain information (including the least significant bits [LSB] and most significant bits [MSB]) which indicates the number of bytes in the cell payload 314 containing all bytes between the MAC header 312 and cell CRC exclusive 316. Reserved fields 336 and 342 may be reserved for other functions and future usage.

Each cell payload 314 may provide appropriate packet fields, such as any Immediate Data, Virtual Address/Memory Handle pairs, and up to 256 bytes of data payload. The cell CRC may consist of 4-bytes of checksum for all of the data in the cell. Accordingly, the maximum size cell as defined by NGIO specification may be, but not limited to, 292 bytes (256-byte Data Payload, 16-byte Header, 16-Byte Virtual Address/Immediate data, and 4-byte CRC). Under the InfiniBand™ specification, the maximum packet size may be larger than the maximum cell size as described with reference to FIG. 3.

Signaling protocols for NGIO/InfiniBand™ links may contain code groups for signaling the beginning and end of a cell and for the gap between cells, and code groups for controlling the flow of cells across the link. For example, Start of Cell (SOC) and End of Cell (EOC) delimiters, inter-cell flow control sequences (Comma character and associated flow control character) and IDLE characters may be taken into account to determine the maximum defined period between IDLE characters.

Descriptors posted from the host system 130 to describe data movement operation and location of data to be moved for processing and/or transportation, via the switched fabric 100' typically provide all the information needed to complete Send, Receive, RDMA Write, and RDMA Read operations. Each send/receive descriptor may be utilized to control the transmission or reception of a single data packet. RDMA descriptors are a superset of send/receive descriptors, and may contain additional information indicating the address of remote information. Unlike send/receive operations where the remote system is also using a descriptor to determine where to transfer message data to or from, RDMA descriptors specifically instruct the target where to transfer the message data to or from, via the use of Virtual Address (VA) and Memory Handle (MH) sent to the remote system. Generally, each descriptor may begin with a control segment followed by an optional address segment and an arbitrary number of data segments. Control segments may contain control and status information. Address segments, for read/write RDMA operations, may contain remote buffer information (i.e., memory associated with the VI targeted to receive the read/write request). Data segments, for both send/receive and read/write RDMA operations, may contain information about the local memory (i.e., memory associated with the VI issuing the send/receive or read/write request).

Figure 3C:
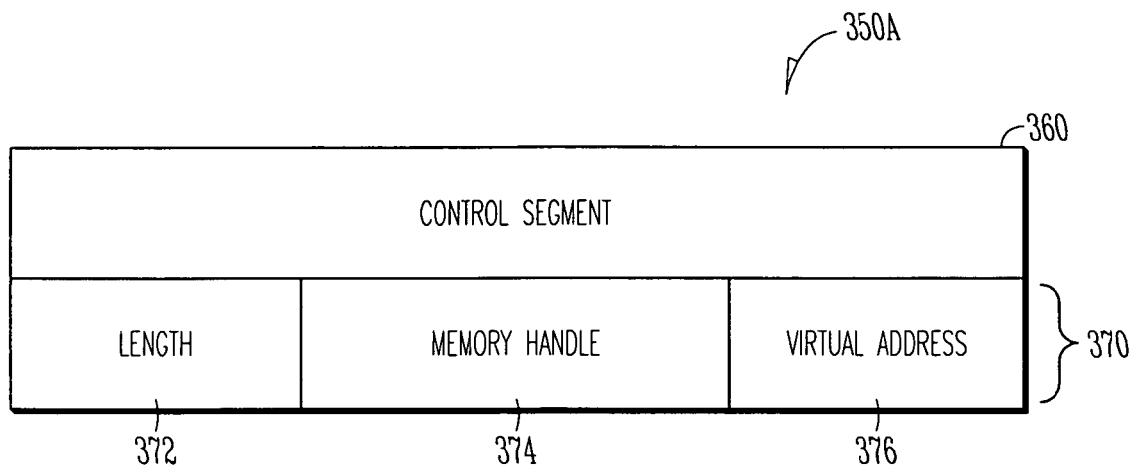

FIG. 3C illustrates an example send/receive type descriptor 350A according to an embodiment of the present invention. As shown in FIG. 3C, the send/receive descriptor 350A may comprise a control segment 360 and a data segment 370 which includes a segment length field 372, a memory handle field 374, and a virtual address field 376. Segment length 372 specifies the length of the message data to be sent or that is to be received. Memory Handle (MH) 374 may be used to verify that the sending/requesting process (i.e., VI) owns the registered memory region indicated by segment length 372 and Virtual Address (VA) 376. For a send operation, Virtual Address (VA) 376 identifies the starting memory location of the message data to be sent in the sending VI's local memory space. For a receive operation, Virtual Address (VA) 376 identifies the starting memory location of where the received message data is to be stored in the requesting VI's local memory space.

Figure 3D:
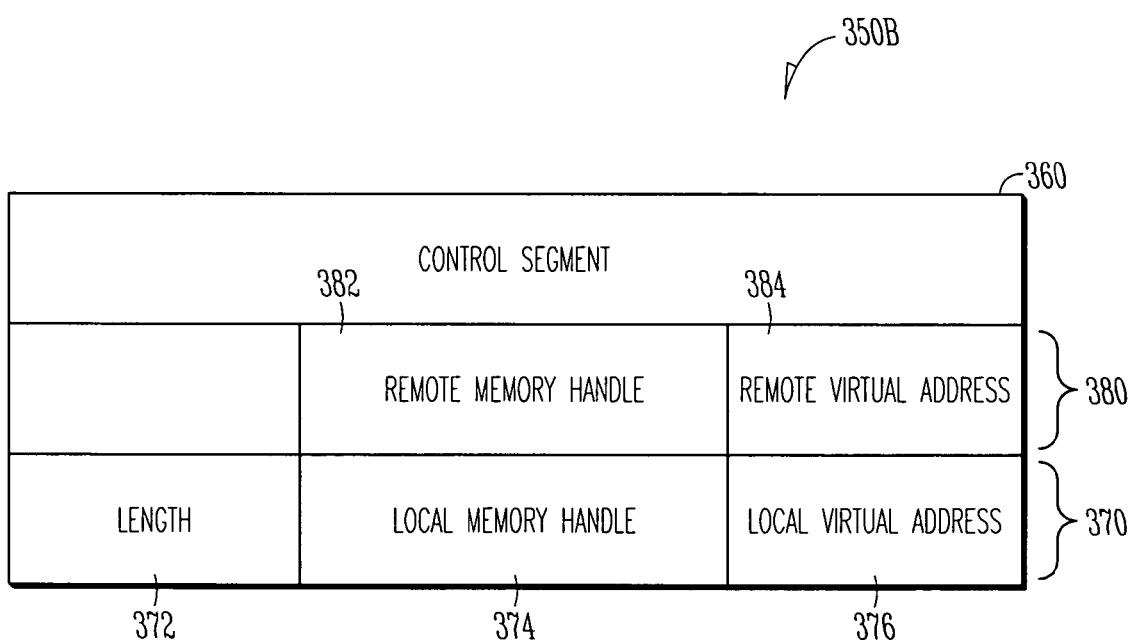

FIG. 3D illustrates an example read/write RDMA type descriptor 350B according to an embodiment of the present invention. As shown in FIG. 3D, the read/write RDMA descriptor 350B may comprise a control segment 360, an address segment 380, and a data segment 370. Address segment 380 contains a remote memory handle field 382 and a remote virtual address field 384. Data segment 370 contains a segment length field 372, a local memory handle field 374, and a local virtual address field 376. For a read operation, remote Virtual Address (VA) 384 identifies the memory location in the remote process' memory space, of the message data to be read. Local Virtual Address (VA) 376 identifies the starting memory location in the local process' memory space of where the received message is to be placed. The amount of memory to be used to store the message data may be specified by segment length field 372. For a write operation, remote Virtual Address (VA) 384 identifies the memory location in the remote process' memory space of the message data to be written. Local Virtual Address (VA) 376 identifies the starting memory location in the local process' memory space of where the message data for the cell to be transferred is read from. The size of the message data is specified by segment length field 372. Remote Memory Handle (MH) 382 corresponds to the Memory Handle (MH) associated with the memory identified by remote Virtual Address (VA) 384. Local Memory Handle 374 corresponds to the Memory Handle (MH) associated with the memory identified by local Virtual Address 376.

Figure 4A:
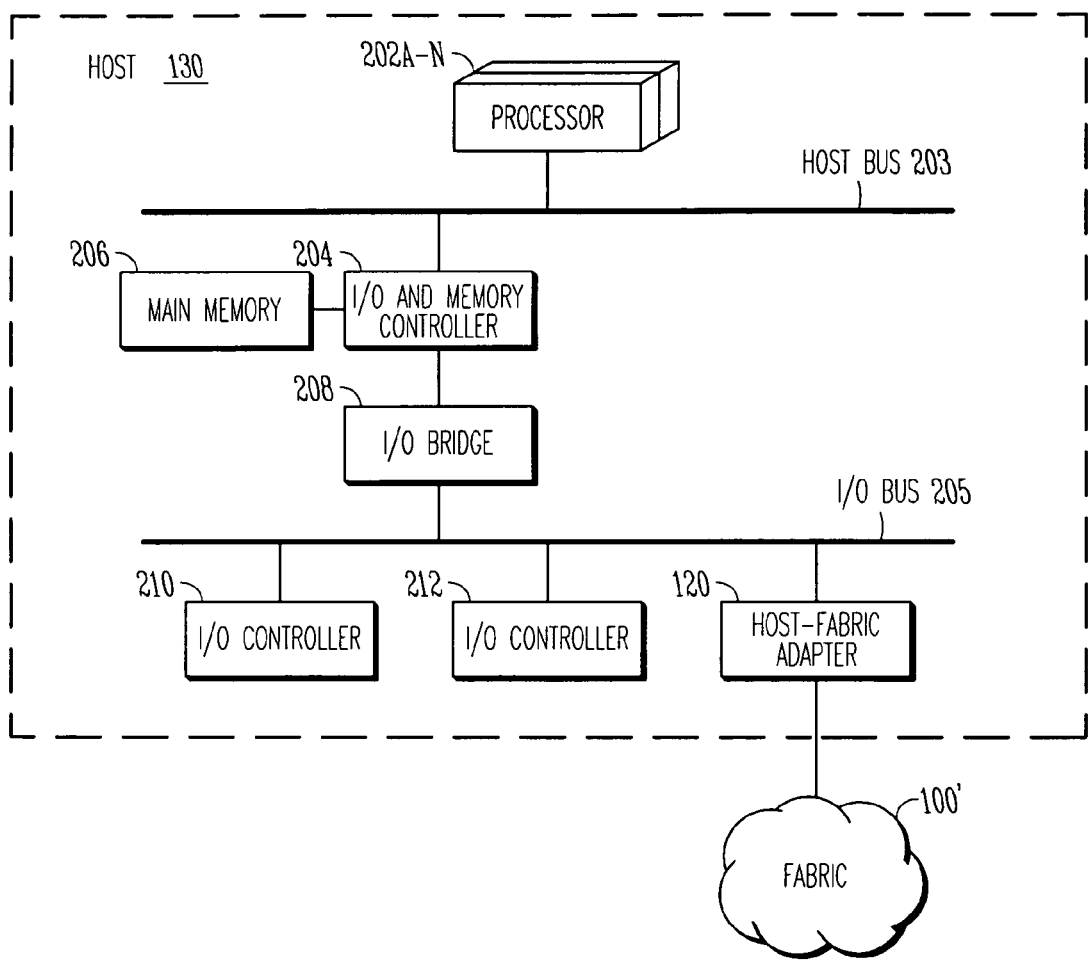
FIGS. 4A–4B illustrate a block diagram of an example host system of an example data network according to different embodiments of the present invention.

Returning to discussion, one example embodiment of a host system 130 may be shown in FIG. 4A. Referring to FIG. 4A, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4B:
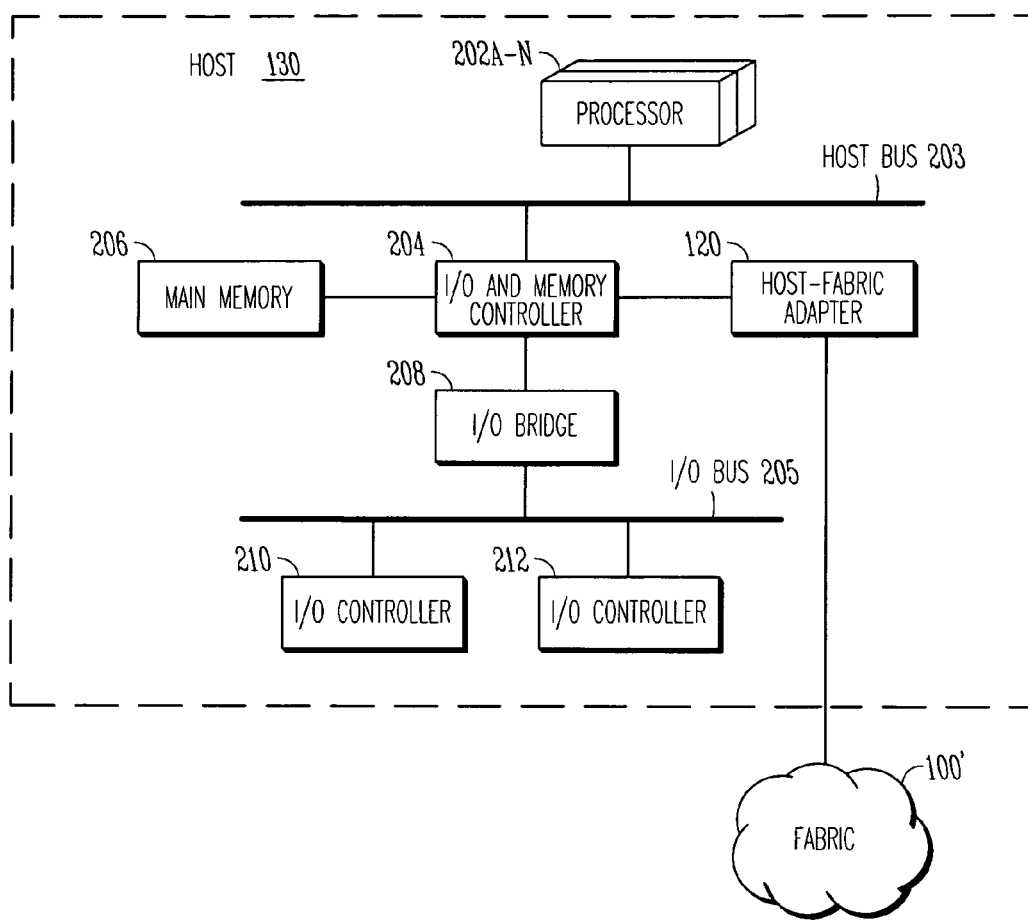

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4B. In either embodiment shown in FIGS. 4A–4B, one or more host-fabric adapters 120 may be provided to interface the host system 130 to the NGIO switched fabric 100'.

FIGS. 4A–4B merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the switched fabric 100', while preferably being compatible with many currently available operating systems, such as Windows 2000.

Figure 5:
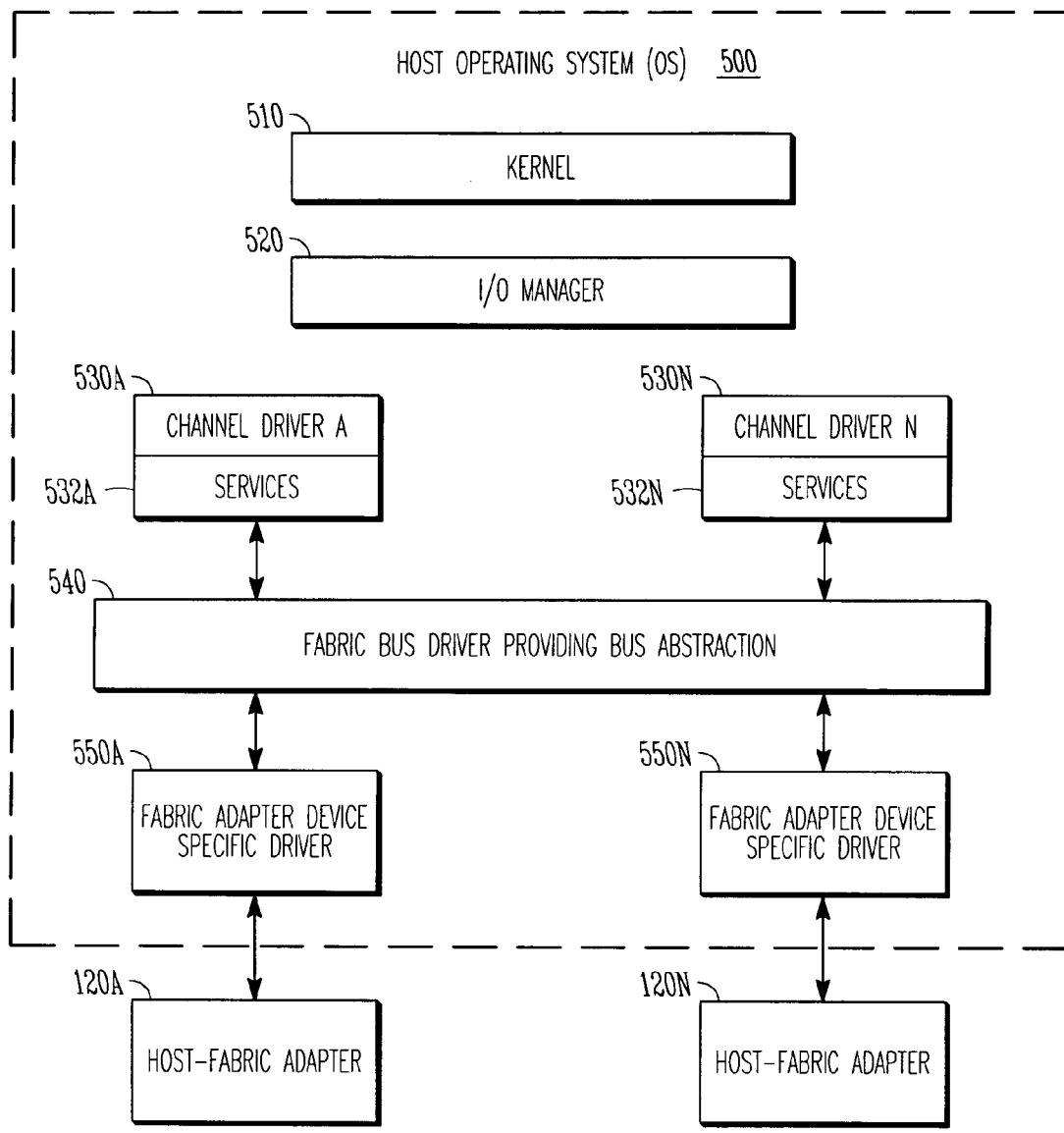
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate IO requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter (otherwise, known as host channel adapter "HCA") driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification*", the "*Next Generation I/O: Intel HCA Connection Services Layer High Level Design*", the "*Next Generation I/O: Intel HCA Abstraction Layer High Level Design*", and the "*Next Generation I/O: Intel HCA Fabric Services Layer High Level Design*" as set forth by Intel on Aug. 6, 1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-Irg specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the send or receive work queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture Specification, Version* 1.0," as set forth by Compaq Corp., Intel Corp., and Microsoft Corp., on to Dec. 16, 1997. VI architecture comprises four basic components: virtual interface (VI) of pairs of works queues (send queue and receive queue) in which requests, in the form of descriptors, are posted to describe data movement operation and location of data to be moved for processing and/or transportation via a switched fabric 100', VI consumer which may be an application program, VI provider which may be hardware and software components responsible for instantiating VI, and completion queue (CQ). VI is the mechanism that allows VI consumer to directly access VI provider. Each VI represents a communication endpoint, and endpoint pairs may be logically connected to support bi-directional, point-to-point data transfers over one or more designated channels of a data network. Under the VI architecture, the host-fabric adapter 120 and VI Kernel agent may constitute the VI provider to perform endpoint virtualization directly and subsume the tasks of multiplexing, de-multiplexing, and data transfer scheduling normally performed by the host operating system (OS) kernel 510 and device specific driver 4550A–550N as shown in FIG. 5. However, other architectures may also be used to implement the present invention.

Figure 6:
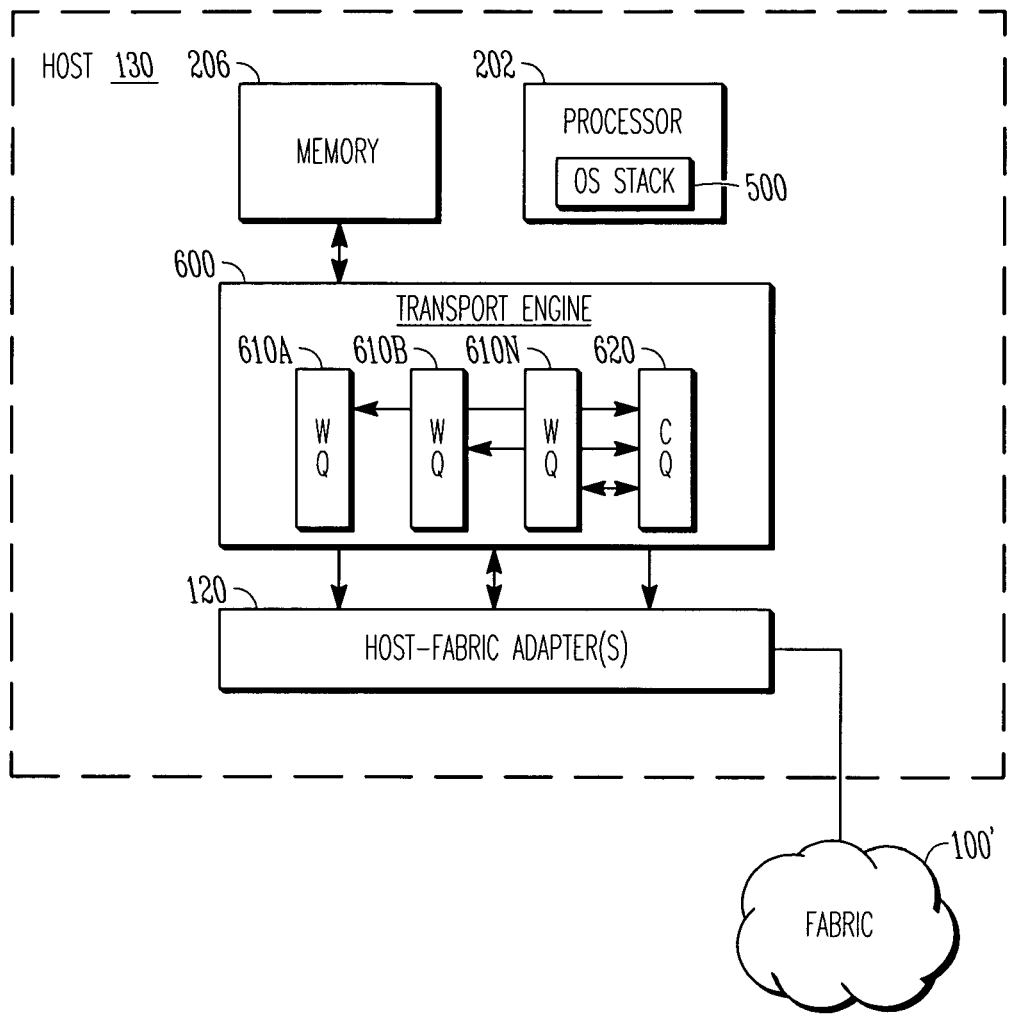
FIG. 6 illustrates a block diagram of an example host system using NGIO/InfiniBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 2, 4A–4B and 5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including inbound (receive) and outbound (send) queues, such as work queues (WQ) 610A–610N in which requests, in the form of descriptors, may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). In one embodiment, each work queue pair (WQP) including separate inbound (receive) and outbound (send) queues has a physical port into a switched fabric 100' via a host-fabric adapter (HCA) 120. However, in other embodiments, all work queues may share physical ports into a switched fabric 100' via one or more host-fabric adapters (HCAs) 120. The outbound queue of the work queue pair (WQP) may be used to request, for example, message sends, remote direct memory access "RDMA" reads, and remote direct memory access "RDMA" writes. The inbound (receive) queue may be used to receive messages.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented services. Requests for work (data movement operations such as message send/receive operations and RDMA read/write operations) may be posted to work queues (WQ) 610A–610N associated with a given fabric adapter (HCA), one or more channels may be created and effectively managed so that requested operations can be performed.

Figure 7:
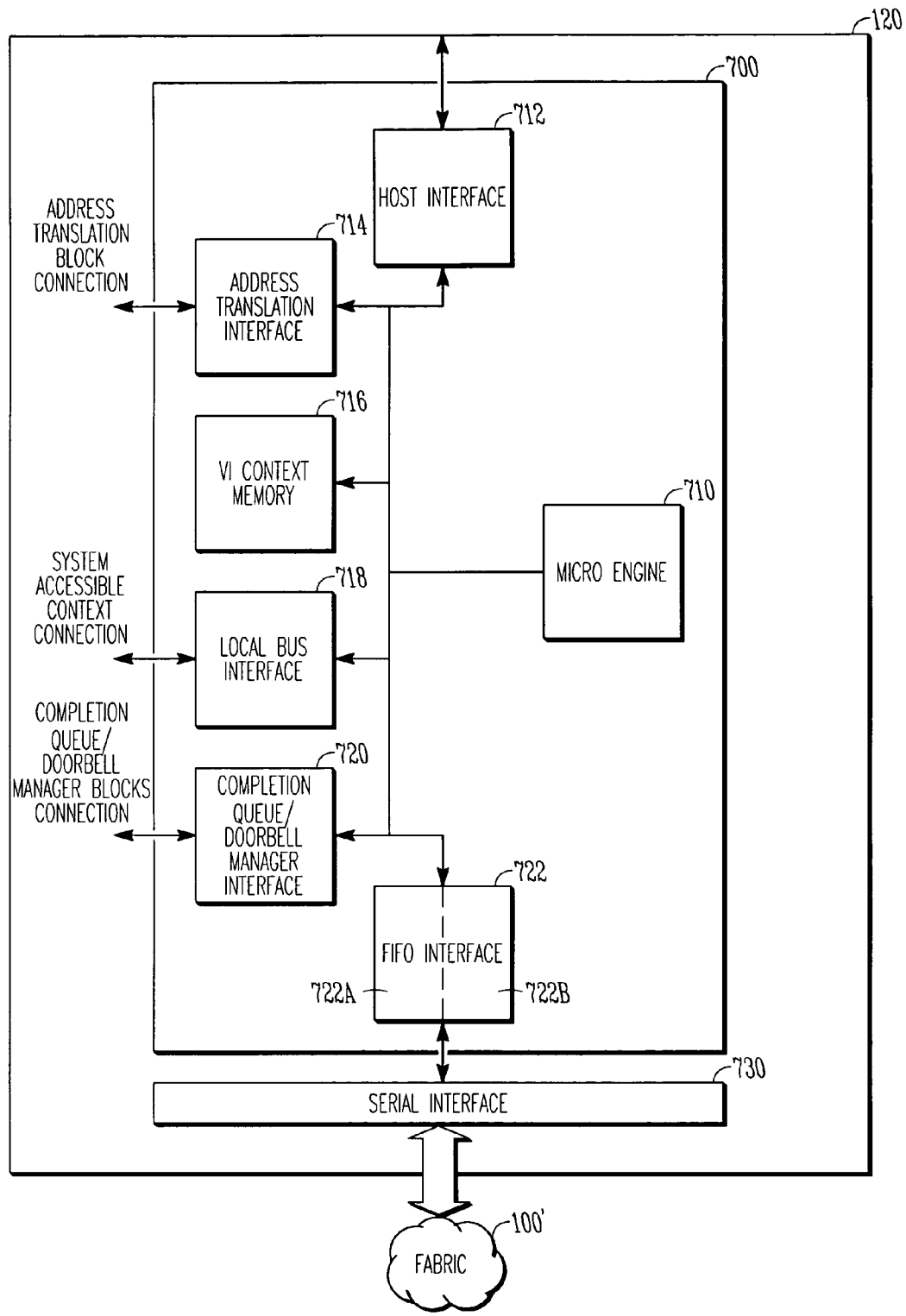
FIG. 7 illustrates an example host-fabric adapter configured in accordance with NGIO/InfiniBand™ and VI architectures to support data transfers via a switched fabric 100' according to an embodiment of the present invention.

Turning now to FIG. 7, an example host-fabric adapter 120 installed at a host system and configured in accordance with NGIO/InfiniBand™ architectures to support data transfers via a switched fabric 100' according to an embodiment of the present invention is illustrated. The example host-fabric adapter 120 is especially designed to connect a host system to a channel-based switched fabric 100' of a data network 100 for services to efficiently establish and manage NGIO/InfiniBand™ channels and support data movement operations between communication devices at a host system or between host systems connected together directly or via the data network 100' using a channel-based, switched fabric architecture. In addition, the host-fabric adapter 120 implements hardware designed for increased performance and efficiency, and optimized for, but not limited thereto, NGIO/InfiniBand™ applications with minimal hardware investment, including controlling execution of NGIO/InfiniBand™ protocols with minimal pipelining and NGIO/InfiniBand™ cell data processing with minimal latency.

As shown in FIG. 7, the host-fabric adapter 120 may include a micro-controller subsystem 700 which controls the execution of the NGIO/InfiniBand™ protocols, and a serial interface 730 which provides an interface with the switched fabric 100', typically via hardware SERDES (serializer/deserializer device). Both the micro-controller subsystem 700 and the serial interface 730 may be implemented as Application Specific Integrated Circuits (ASICs) of the host-fabric adapter 120.

The micro-controller subsystem 700 contains one or more programmable direct-memory-access (DMA) engine(s) known as a Micro-Engine (ME) 710 utilized to build, send, receive and acknowledge NGIO/InfiniBand™ cells/packets between the host memory 206 (see FIG. 6) and a serial link, and special purpose hardware interface logic blocks such as a host interface 712, an address translation interface 714, a VI context memory interface 716, a local bus interface 718, a completion queue/doorbell manager interface 720, and a first-in/first-out (FIFO) interface 722 controlled by the Micro-Engine (ME) 710 to perform many ME functions needed to implement the NGIO/InfiniBand™ and VI specifications, including, for example, host transactions, context updates, physical address translations, host descriptor fetches, doorbell management, FIFO data movements and completion queue (CQ) management.

The Micro-Engine (ME) 710 may execute MicroCode to coordinate send queue and receive queue operations for transmitting and receiving NGIO/InfiniBand™ cells/packets and to support completion queues (CQ) and channels in compliance with the NGIO/InfiniBand protocols. The Micro-Engine (ME) 710 may also control all the interface blocks through a set of micro register reads and writes. Micro registers may be available with data supplied by multiple interface blocks to help speed up MicroCode functions.

The host interface 712 provides an interface to either an I/O bus 205 of a host system 130 as shown in FIG. 4A, or an I/O and memory controller 204 of a host system 130 as shown in FIG. 4B for host transactions, including controlling arbitration and data/control multiplexing between different requesters, read and write transactions to the host system 130 and facilitating read completions.

The address translation interface 714 provides an interface to an address translation block (not shown) responsible for managing the conversion of virtual address (used to address program space) to physical addresses (used to address system space) and validating access to memory.

The context memory interface 716 provides an interface to a context manager (not shown) responsible for providing the necessary context for a work queue pair (WQP) used for sending and receiving NGIO/InfiniBand™ cells/packets. The context memory interface 716 also provides an interface to host software and presents different types of memory mapped register sets which specify channel configurations and to initiate channel operations. For example, the memory mapped register sets may include global HCA context registers which affect the operation of work queues (WQ), work queue pair (WQP) registers which control the establishment of channels, and completion queue (CQ) registers which specify the location and length of a completion queue (CQ) in host memory 206 and control whether interrupts are ram generated when completion queue (CQ) entries are written.

The local bus interface 718 provides an interface to a local data bus responsible for supporting system accessible context connections and channel operations, and for turning the signal data into appropriate forms for the Micro-Engine (ME) 710, including MicroCode loading.

The completion queue/doorbell manager interface 720 provides an interface to completion queues, and doorbell manager and memory registration rules of the VI architecture.

The FIFO interface 722 provides an interface to the serial interface 730. The FIFO interface 722 may include a Receive FIFO interface 722A arranged to receive request(s) and/or data packet(s) from the switched fabric 100' via a Receive FIFO and a serial interface 730, and a Transmit FIFO interface 722B arranged to send request(s) and/or data packet(s) to the switched fabric 100' via a Transmit FIFO and a serial interface 730.

The Receive FIFO interface 722A may be used by the Micro-Engine (ME) 710 to process incoming data cells/packets, via the serial interface 730, including checking the header of each cell/packet for errors and checking if additional data needs to be read before passing the same to the host interface 712. The Transmit FIFO interface 722B may be used by the Micro-Engine (ME) 710 to build data cells/packets for subsequent transmission, via the serial interface 730.

In addition, a Scheduler (not shown) may also be included for scheduling the next Virtual Interface (VI) to the context manager and supporting priority of traffic for data cells/packets associated with send work queues (WQ) and receive work queues (WQ). Such a Scheduler may be provided to interface with the context memory interface 716, the local bus interface 718 and the completion queue/doorbell manager interface 720 for scheduled functions.

Figure 8:
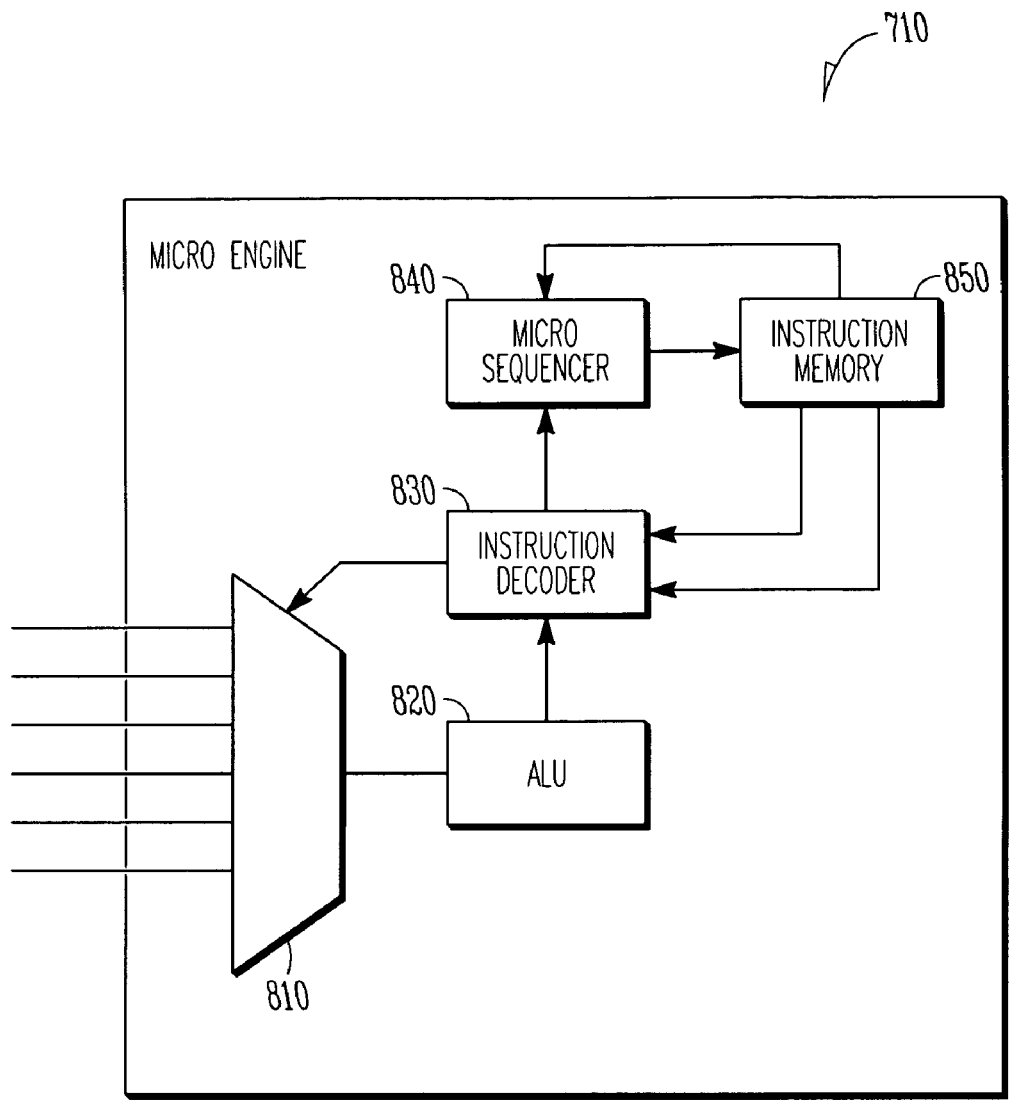
FIG. 8 illustrates an example Micro-Engine (ME) of a host-fabric adapter according to an embodiment of the present invention.

FIG. 8 illustrates a general example Micro-Engine (ME) 710 configured to handle multiple independent operations (known as tasks) for performance efficiency with minimum hardware investment according to an embodiment of the present invention. As shown in FIG. 8, the Micro-Engine (ME) 710 may comprise one or more Data Multiplexers (MUXs) 810, an Arithmetic Logic Unit (ALU) 820, an Instruction Decoder 830, a Micro-Sequencer 840, and an Instruction Memory 850. The Instruction Memory 850 may store downloadable MicroCode for ME instructions. The data MUXs 810 may supply appropriate interface data based on ME instructions. The Arithmetic Logic Unit (ALU) 820 may perform any mathematical, logical and shifting operations. The Instruction Decoder 830 may supply system controls to the Micro-Sequencer 840 to determine the next instruction or address to be executed, execute ME instructions from the Instruction Memory 850, and determine the functions of the ALU 820. The Micro-Sequencer 840 may check the sequence of ME instructions and determine which next instruction is to be executed by the Instruction Decoder 820.

Figure 9:
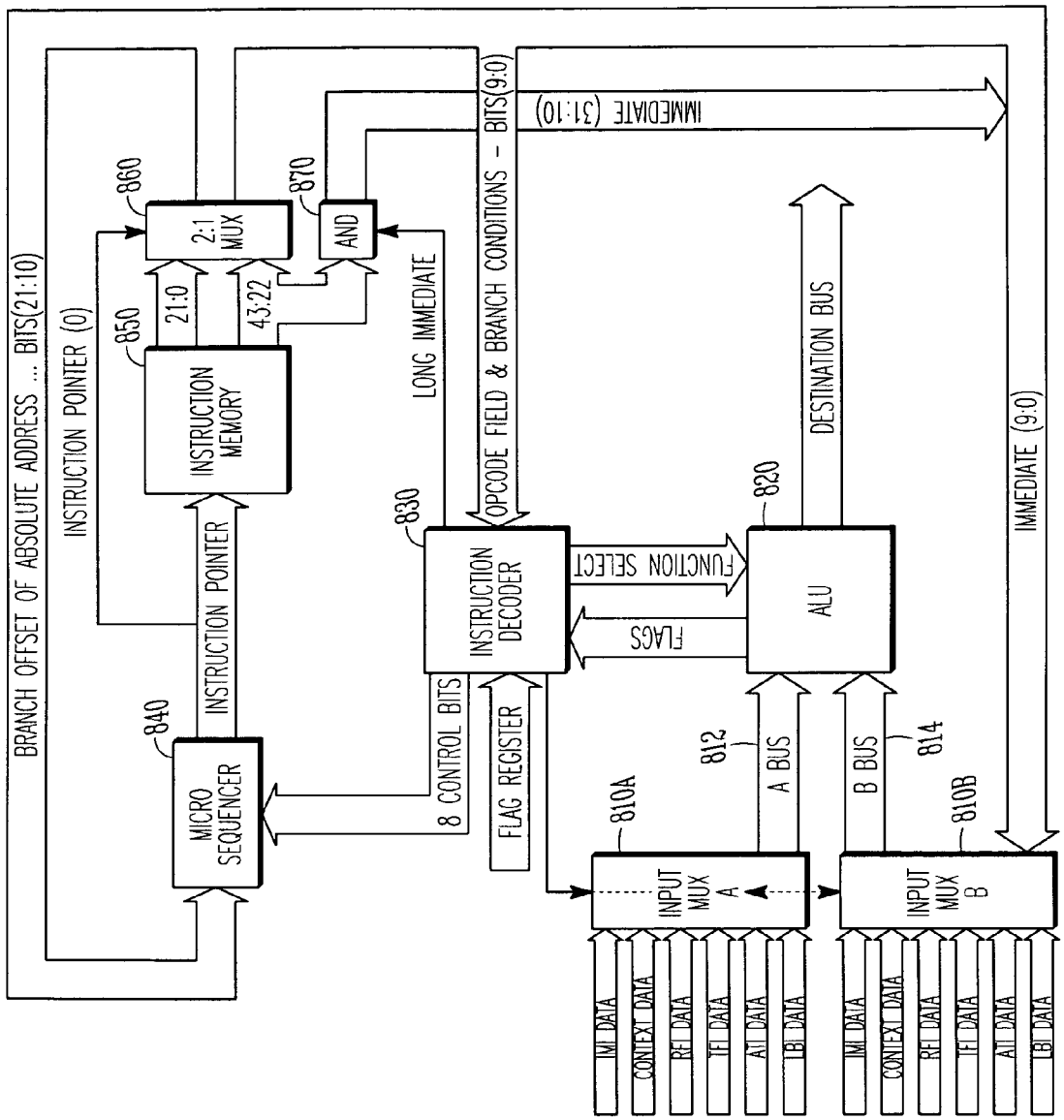
FIG. 9 illustrates an example implementation of a Micro-Engine (ME) of a host-fabric adapter according to an embodiment of the present invention.

One example implementation of the data MUXs 810, the Arithmetic Logic Unit (ALU) 820, the Instruction Decoder 830, the Micro-Sequencer 840, and the Instruction Memory 850 of an example Micro-Engine (ME) 710 may be described with reference to FIG. 9 hereinbelow:

Data MUX 810: There may be two input data MUXs, input MUX-A 810A and input MUX-B 810B which supply two 32-bit buses (A-bus and B-bus) inputs to the ALU 820. The A-bus 812 may supply data based on decode of the destination field of the ME instruction to the ALU 820. Likewise, the B-bus 814 may supply data based on decode of the source field of the ME instruction to the ALU 820. The data inputs to the input data MUXs 810A and 810B may be supplied by external interface blocks such as the host interface 712, the address translation interface 714, the VI context memory 716, the local bus interface 718, the completion queue/doorbell manager interface 720, and the first-in/first-out (FIFO) interface 722 needed to control many ME functions. The input MUX-B 810B may include Immediate Data from the ME instruction, via 2:1 Multiplexer (MUX) 860 and logic AND gate 870. The decode of the destination/source field, which generate the selects for the input MUX-A 810A and MUX-B 810B, may be executed by the Instruction Decoder 830.

Arithmetic Logic Unit (ALU) 820: The ALU 820 may contain two (A and B) 32-bit data inputs and perform functions that are based on the OpCode field of the ME instruction. The functions supported include, but are not limited to, Add, Subtract, OR, XOR, AND, Compare, Rotate Right, Shift Left, Bit test and Move (pass through). The Instruction Decoder 830 decodes the ME instruction and provides the function select signals to the ALU 820. After executing the selected function, the ALU 820 sets flags based on the outcome. The flags may include, for example, Zero and Carry. If the result of an arithmetic function is zero, the Z flag may be set. In contrast, if the arithmetic function results in a carry out, the C flag may be set. Results of ALU functions may affect the state of the Z flag.

Instruction Memory 850: The Instruction Memory 850 may be a static random-access-memory SRAM provided to store MicroCode for providing ME instructions via 2:1 Multiplexer (MUX) 860 and logic AND gate 870. Micro-Code may be downloadable into the SRAM for changes in future NGIO/InfiniBand™ specification enhancements. The SRAM may contain 2K×44 bits and may be loaded via the local bus. Each ME instruction may be 22 bits, for example, and two instructions may be allowed for each word of SRAM. Instructions with 32 bit Immediate Data occupy 44 bits, counting as two instructions. The MicroCode supplied by the SRAM may be available in different code formats.

Micro-Sequencer 840: The Micro-Sequencer 840 may determine the address sequence of the Micro-Engine (ME) 710 from the decode of the ME instruction and Flag register information. The next address sequence may be controlled by the Instruction Decoder 830 which passes 8 bits of Control Field information (i.e., 8 Control Field signals) to the Micro-Sequencer 840.

Major challenges implementing a host-fabric adapter as shown in FIG. 7 are to maximize performance of the Micro-Engine (ME) 710 and to efficiently use ME resources in processing NGIO/InfiniBand™ cells/packets with minimal latency. Hardware Assist (HWA) Logics may be incorporated into one or more special purpose hardware interface logic blocks, such as the host interface 712, the address translation interface 714, the VI context memory interface 716, the local bus interface 718, the completion queue/doorbell manager interface 720, and the FIFO interface 722, in order to assist their respective interface functions and to help offloading the Micro-Engine (ME) 710 from some hardware calculations to process NGIO/InfiniBand™ cells/packets. For example, Hardware Assist (HWA) Logics may be implemented in the local bus interface 718 and both in the Receive FIFO interface 722A and Transmit FIFO interface 722B so as to help offloading the Micro-Engine (ME) 710 from cell/packet processing tasks, including header Micro-Engine access for the processing cells/packets and header checking operations.

Figure 10:
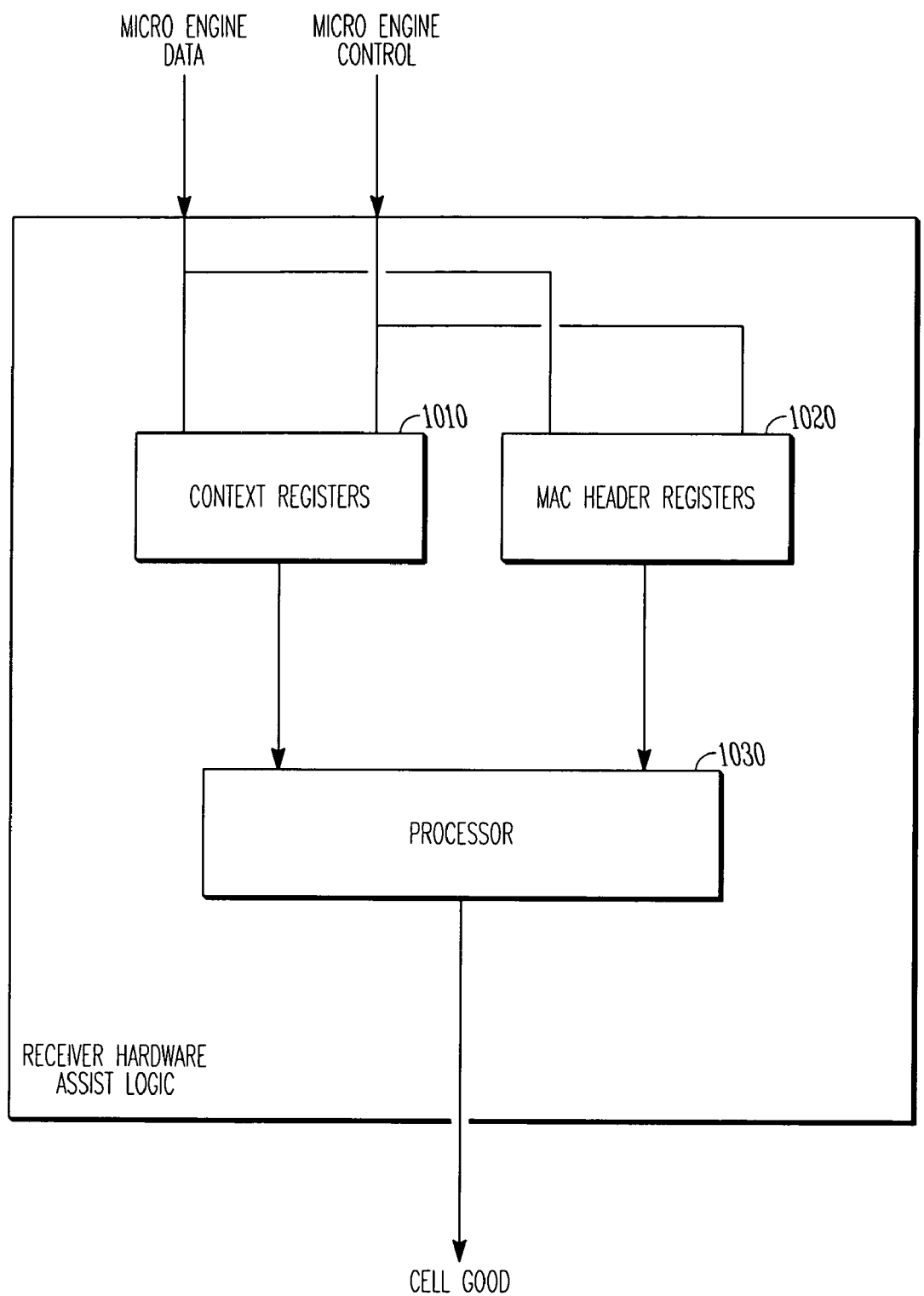
FIG. 10 illustrates an example Receiver Hardware Assist (HWA) mechanism according to an embodiment of the present invention.

More specifically, FIG. 10 illustrates an example Receiver MAC Header Hardware Assist (HWA) Mechanism according to an embodiment of the present invention. Such a Receiver MAC Header Hardware Assist (HWA) Mechanism may be incorporated into the Receiver FIFO interface 722A to check/process the MAC header of incoming cells/packets as shown in FIGS. 3A–3B from the serial interface 730 so as to offload the Micro-Engine (ME) 710 from having to check/process the MAC header of incoming cells/packets and allow the Micro-Engine (ME) 710 to perform other functions while the header checks are being completed. The Receiver MAC Header Hardware Assist (HWA) Mechanism uses information stored in the context memory and the MAC header information from the cell/packet to determine if an incoming cell/packet is good or bad, via the serial interface 730.

As shown in FIG. 10, the Header Hardware Assist (HWA) Mechanism may comprise three basic components, including 5 bytes of context registers 1010, 16 bytes of MAC header registers 1020, and a cell/packet processor 1030. The context registers 1010 may be loaded with context information pertaining to an incoming cell/packet as soon as the Micro-Engine (ME) 710 is scheduled to work on the incoming cell/packet. Likewise, the header registers 1020 may be loaded with header information of the incoming cell/packet. The cell/packet processor 1030 may then take the context information and the header information and make a determination of whether an incoming cell/packet is good. A determination of whether an incoming NGIO cell is good requires a number of checks and comparisons of header fields of the NGIO cell as described with reference to FIG. 3B, including Priority, Version, Source Address, Source Work Queue, OpCode, Length, Cell Sequence Number (CSN), and Packet Sequence Number (PSN). Those header checks and comparisons may be described as follows:

| | |
|---|---|
| (1) Version Compare: | 4 bit equal comparison of the context version vs. the cell version. |
| (2) Priority Compare: | 4 bit equal comparison of the context priority vs. the cell priority. |
| (3) Source Address Compare: | 16 bit equal comparison of the context destination address vs. the cell source address. |
| (4) Source Work Queue Compare: | 16 bit equal comparison of the context destination work queue (WQ) vs. the cell source work queue (WQ) number. |
| (5) Port Compare: | 4 bit equal comparison of the context port value vs. the port the cell was received on. |
| (6) Channel Configuration Check: | Comparison of the cell OpCode vs. the context channel configuration type. The channel configuration is a 2-bit value. Each configuration has a subset of cell OpCodes that are acceptable. |
| (7) OpCode Consistency Check: | Comparison of the cell OpCode with cell context information to see if the OpCode is valid, the type of cell received (RDMA, Send, Ack), the cell order (first, last, middle, or first and last in a packet) and data (Immediate Data, RDMA length, Ack Response). |
| (8) Length Consistency Check: | Comparison of the cell OpCode with the cell length to ensure the length is in the acceptable range for that OpCode. |
| (9) Read Permission Check: | Comparison of the cell OpCode with the cell context read permission bit. |
| (10) Write Permission Check: | Comparison of the cell OpCode with the cell context write permission bit. |
| (11) Cell Sequence Number Check: | 8 bit comparison of the cell CSN and the cell context expected CSN. |
| (12) Packet Sequence Number Check: | Multiple 8 bit comparisons of the cell PSN with the Expected PSN based to find the relative position of the PSN. |

Header Compare Logics for Packet Sequence Number (PSN), OpCode and Length header fields may be more complex than other header fields since each PSN, OpCode and Length has multiple checks. Similar header checks and comparisons are also required for InfiniBand™ data packets received, via the serial interface 730 (see FIG. 7). In either situation, after all header checks are performed simultaneously (in parallel during a single clock), the cell/packet processor 1030 may generate a single bit output indicating if the all of the header checks have passed. This single bit may then be used by the Micro-Engine (ME) 710 to determine whether to continue with the processing of the incoming cell/packet or if the cell/packet is to be aborted due to an error. This way ME performance can be maximized since the hardware allows each header to check to be computed in parallel with one another while offloading the Micro-Engine (ME) 710 from having to spend up to 40 clocks to process header checks separately. In addition, a smaller number of logic gates required to implement the Micro-Engine (ME) 710 can be obtained for low cost and high speed processing of NGIO/InfiniBand™ cells/packets. An example Hardware Assisted Cell Processing Pseudo-Code may be provided hereinbelow:

| Clock | Instructions | |
|---|---|---|
| 1. | Load MAC Header into Header Registers | get Cell and Context values loaded into comparators to start checking |
| 2. | Load Context values into Context Registers | |
| 3. | Compare Cell Version to Context Version | Simple one clock compare |
| 4. | If equal continue, else go to Bad_Header | |
| 5. | Compare Cell Priority to Context Priority | Simple one clock compare |
| 6. | If equal continue, else go to Bad_Header | |
| 7. | Compare Cell Src Address to Context Dest Address | Simple one clock compare |
| 8. | If equal continue, else go to Bad_Header | |
| 9. | Compare Cell Source WQ to Context Version | Simple one clock compare |
| 10. | If equal continue, else go to Bad_Header | |
| 11. | Compare Port received from to Context Port | Simple one clock compare |
| 12. | If equal continue, else go to Bad_Header | |
| 13. | Compare Channel Config. of Cell OpCode to Context Channel Config. | Simple one clock compare |
| 14. | If equal continue, else go to Bad_Header Complex check. This needs ~ 10 clocks | |
| 15. | Compare Cell OpCode to Various Context and Length registers | |
| 25. | If valid continue, else go to Bad_Header Complex check. This needs ~ 5 clocks | |
| 26. | Compare Cell Length to Cell OpCode | |
| 31. | If valid continue, else go to Bad_Header | |
| 32. | Compare Cell OpCode with Context Read Permission Bit | Simple one clock compare |
| 33. | If equal continue, else go to Bad_Header | |
| 34. | Compare Cell OpCode with Context Write Permission Bit | Simple one clock compare |
| 35. | If equal continue, else go to Bad_Header | |
| 36. | Compare Cell CSN to Context CSN | Simple one clock compare |
| 37. | If equal continue, else go to Bad_Header Complex check. This needs ~ 10 clocks | |
| 38. | Compare Cell PSN to Context PSN | |
| 48. | If equal continue, else go to Bad_Header | |

As shown in the Pseudo-Code, if all the header checks are done in Micro-Code of the Micro-Engine (ME) 710, the total header checking time may be 48 clocks. However, if all the header checks are done in hardware and in parallel, the savings may be 35 clocks over Micro-Code only solution.

Figure 11:
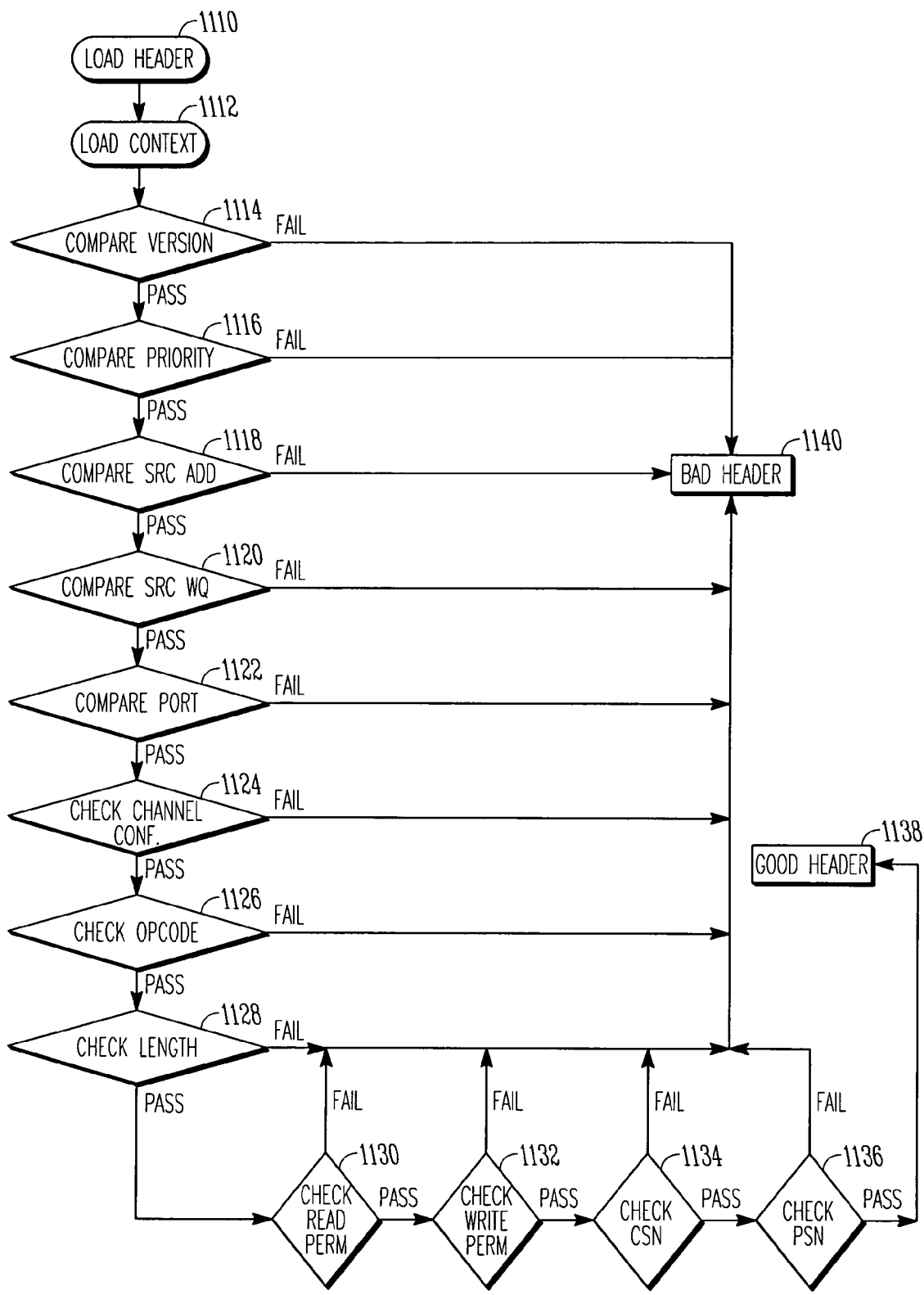
FIG. 11 illustrates an example header checking process without using the Receiver FIFO Hardware Assist (HWA) mechanism according to an embodiment of the present invention.

FIG. 11 illustrates an example header checking process without using the Receiver FIFO Hardware Assist (HWA) mechanism according to an embodiment of the present invention. Normally the Micro-Engine (ME) 710 is configured to process each of the header checks and comparisons separately. As shown in FIG. 11, the header information of an incoming cell/packet and the context information pertaining to the incoming cell/packet may be loaded into the Micro-Engine (ME) 710 at steps 1110 and 1112. The Micro-Engine (710) may then process all twelve (12) header checks and comparisons separately, namely compare the context version with the of cell/packet version at step 1114, compare the context priority with the cell/packet priority at step 1116, compare the context destination address with the source address of the incoming cell/packet at step 1118, compare the context destination work queue (WQ) number with the source work queue (WQ) number of the incoming cell/packet at step 1120, compare the context port value with the port the incoming cell/packet was received at step 1122, compare the context channel configuration with the OpCode of the incoming cell/packet and check for channel configuration error (if the OpCode of the incoming cell/packet is valid for channel configuration type specified in work queue context) at step 1124, check for OpCode consistency at step 1126, check for length consistency at step 1128, check for read permission at step 1130, check for write permission at step 1132, check for Cell Sequence Number (CSN) at step 1134, and check for Packet Sequence Number (PSN) at step 1136.

If all the serial header checks are successful, the header of the incoming cell/packet may be designated as "good" header at step 1138 and may enable the Micro-Engine (710) to continue processing NGIO/InfiniBand™ cells/packets. However, if any one of those header checks is not successful, the header of the incoming cell/packet may be designated as "bad" header at step 1140 and may be aborted due to an error. A corresponding payload of the incoming cell/packet may then be discarded.

Figure 12:
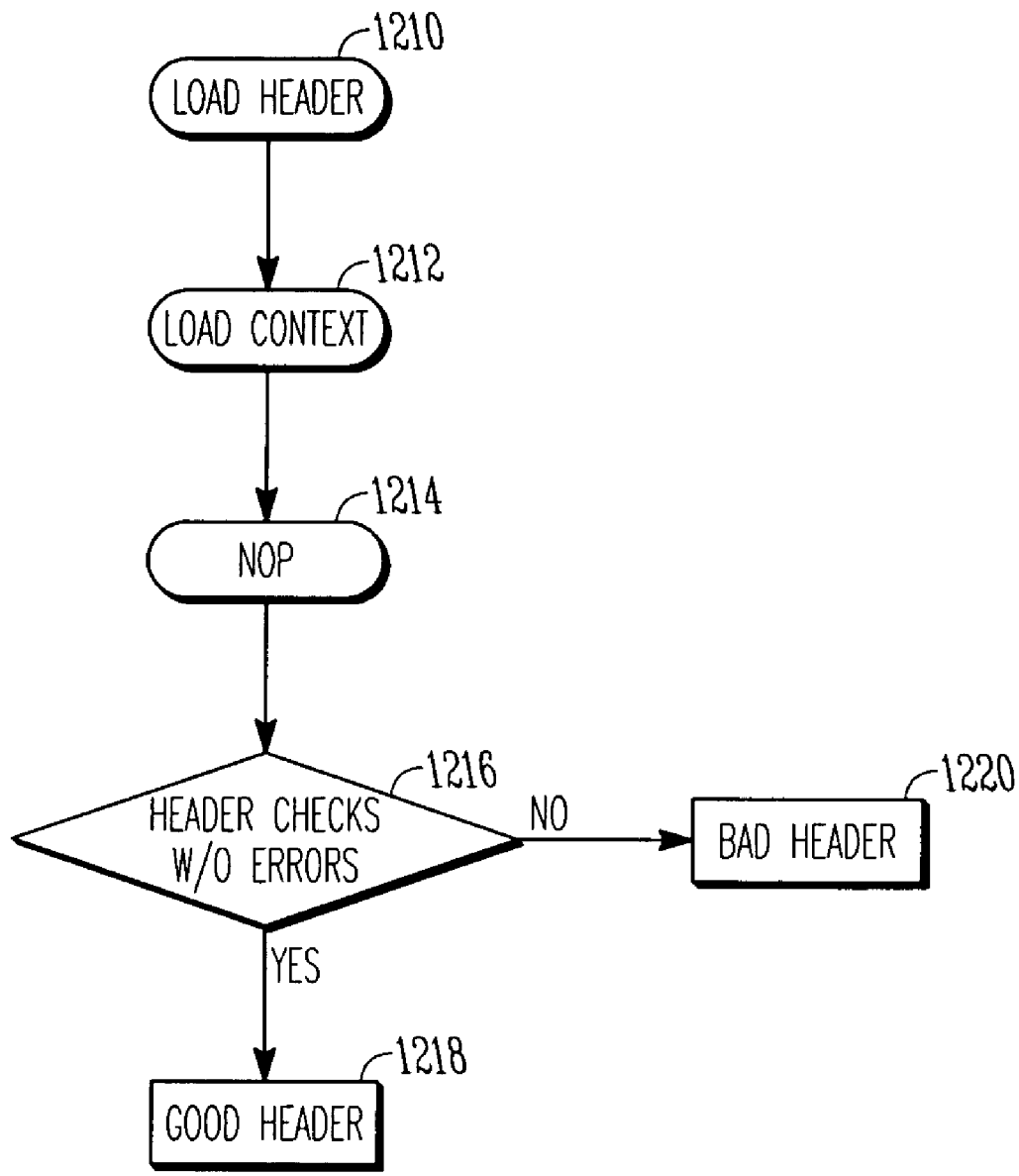
FIG. 12 illustrates an example header checking process using the Receiver FIFO Hardware Assist (HWA) mechanism.

FIG. 12 illustrates an example header checking process using the Receiver FIFO Hardware Assist (HWA) mechanism shown in FIG. 10. As shown in FIG. 12, the header information of an incoming cell/packet and the context information pertaining to the incoming cell/packet may be loaded at steps 1210 and 1212 similarly as described with reference to FIG. 11. The Receive FIFO Hardware Assist (HWA) mechanism may then wait for a NOP cycle (a dead cycle) at step 1214 and begin to process in parallel all twelve (12) header checks and comparisons at the same time at step 1216, namely compare the context version with the cell/packet version, compare the context priority with the cell/packet priority, compare the context destination address with the source address of the incoming cell/packet, compare the context destination work queue (WQ) number with the source work queue (WQ) number of the incoming cell/packet, compare the context port value with the port the incoming cell/packet was received, check for channel configuration error (if the OpCode of the incoming cell/packet is valid for channel configuration type specified in work queue context), check for OpCode consistency, check for length consistency, check for read permission, check for write permission, check for Cell Sequence Number (CSN) and check for Packet Sequence Number (PSN).

If all the parallel header checks are successful, the header of the incoming cell/packet may be designated as "good" header at step 1218 and may enable the Micro-Engine (710) to continue processing NGIO/InfiniBand™ cells/packets. However, if any one of those header checks is not successful, the header of the incoming cell/packet may be designated as "bad" header at step 1220 and may be aborted due to an error. Likewise, a corresponding payload of the incoming cell/packet may then be discarded.

Figure 13A:
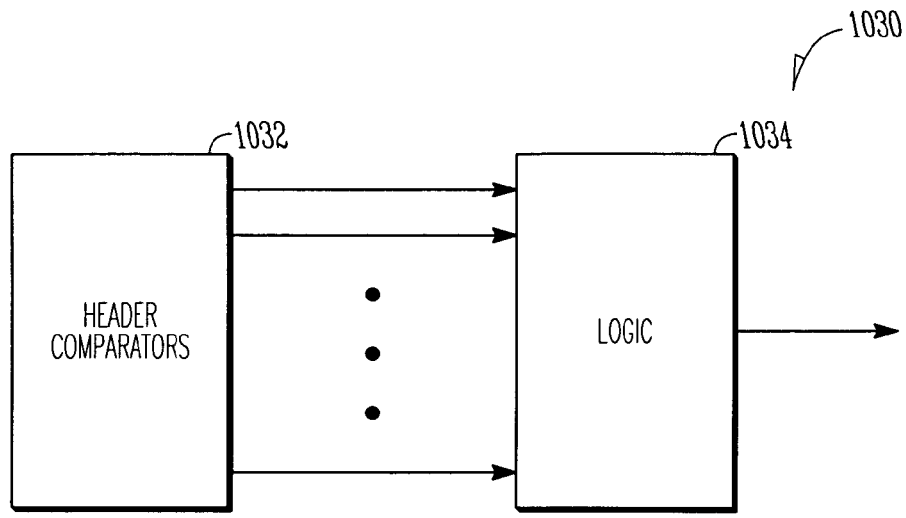
FIGS. 13A–13B illustrate different embodiments of an example cell/packet processor of the Receiver FIFO Hardware Assist (HWA) mechanism.
Figure 13B:
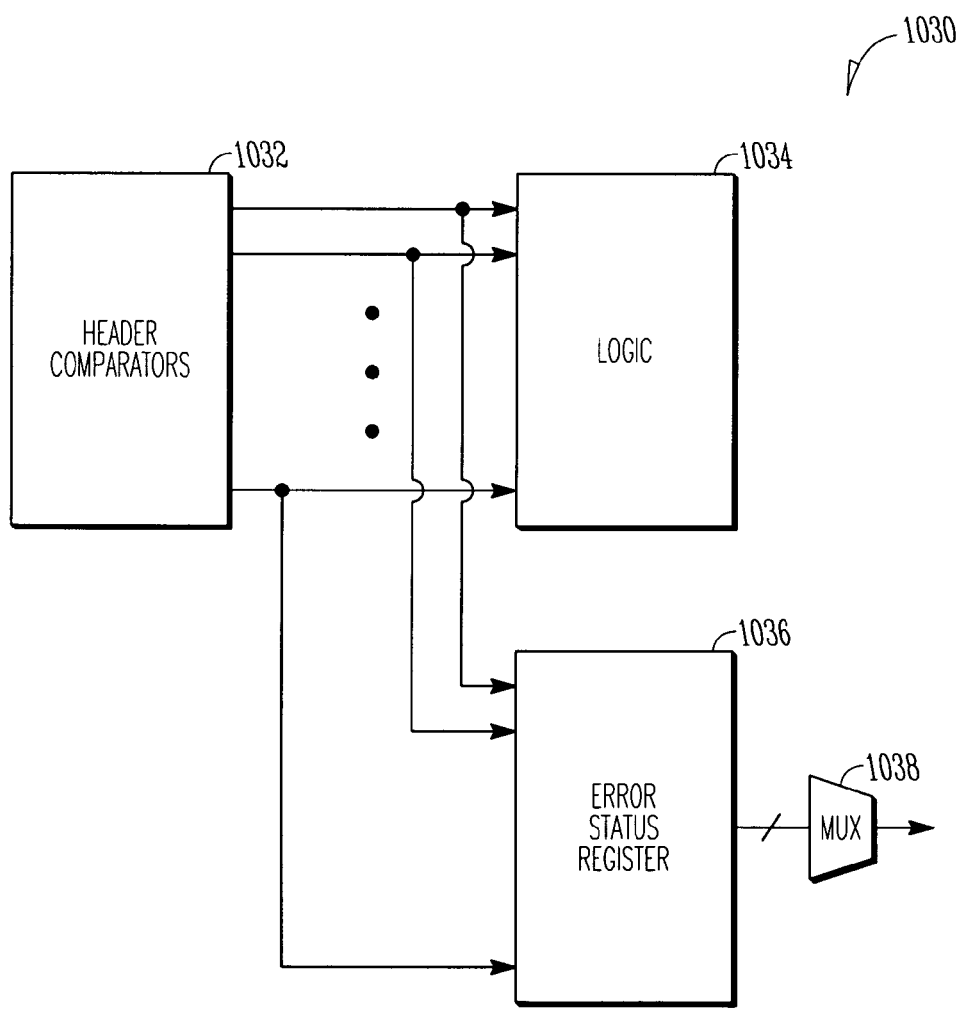

FIGS. 13A–13B illustrate different embodiments of an example cell/packet processor 1030 of the Receiver FIFO Hardware Assist (HWA) mechanism shown in FIG. 10. The cell/packet processor 1030 may be implemented as part of an Application Specific Integrated Circuit (ASIC). For example, as shown in FIG. 13A, the cell/packet processor 1030 may comprise header comparators 1032 arranged to process in parallel all twelve (12) header checks and comparisons, and a combine logic 1034 arranged to indicate whether an incoming cell/packet is good based on header check results. Specifically the header comparators 1032 may be arranged to (1) compare the context version with the cell/packet version of an incoming cell/packet, (2) compare the context priority with the cell/packet priority, (3) compare the context destination address with the source address of the incoming cell/packet, (4) compare the context destination work queue (WQ) number with the source work queue (WQ) number of the incoming cell/packet, (5) compare the context port value with the port the incoming cell/packet was received, (6) check for channel configuration error (if the OpCode of the incoming cell/packet is valid for channel configuration type specified in work queue context), (7) check for OpCode consistency, (8) check for length consistency, (9) check for read permission, (10) check for write permission, (11) check for Cell Sequence Number (CSN), and (12) check for Packet Sequence Number (PSN). The combine logic 1034 may be an AND gate which responds to all header check results and, if all those header check results are successful, generates an indication that the header of the incoming cell/packet is "good". If any of those header check results is unsuccessful, the combine logic 1034 may generate an indication that the header of the incoming cell/packet is "bad".

In addition to the header comparators 1032 and the combine logic 1034 shown in FIG. 13A, the cell/packet processor 1030 may also incorporate additional logics to enable the Micro-Engine (ME) 710 to determine an error status. For example, as shown in FIG. 13B, an Error Status Register 1036 may be connected to output lines of the header comparators 1032 and register as error status bits if any one of those header check results is unsuccessful. A Multiplexer 1038 may then be arranged to produce ME_readable data to enable the Micro-Engine (ME) 710 to determine the error status registered.

Figures 14A, 14B:
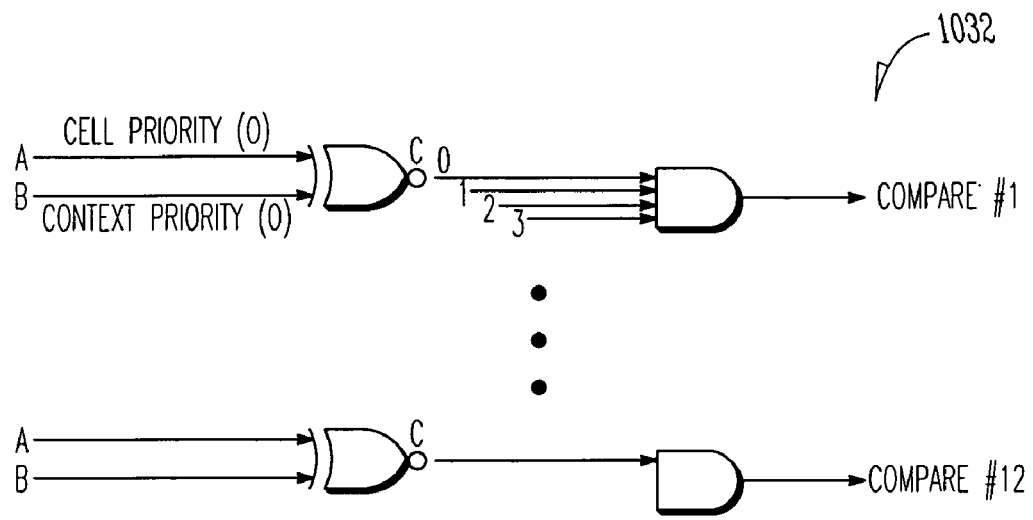
FIGS. 14A–14B illustrate example implementations of header comparators of the cell/packet processor.

Example implementations of header comparators 1032 of the cell/packet processor 1030 are shown in FIGS. 14A–14B. For example, the header comparators 1032 may comprise a series of simple Compare Logics, as shown in FIG. 14A, including XOR gates and AND gates arranged in parallel to make comparisons between the context version with the cell/packet version of an incoming cell/packet, the context priority with the cell/packet priority, the context destination address with the source address of the incoming cell/packet, the context destination work queue (WQ) number with the source work queue (WQ) number of the incoming cell/packet, the context port value with the port the incoming cell/packet was received, and check for channel configuration error, read permission, write permission, and Cell Sequence Number (CSN).

For example, as described with reference to FIG. 3B, the Priority field of an incoming cell header has 4-bits of information for indicating the priority of an incoming cell associated with a given VI. Therefore, four (4) XOR gates and a single AND gate may be required to produce priority check results. Specifically, each bit of cell priority "A" may be XORed with a to corresponding bit of context priority "B" by a corresponding XOR gate in parallel with other bits of cell priority "A" and context priority "B". Logic outputs "C" may then be ANDed in parallel with other logic outputs in order to produce a priority compare result (Compare #1). Likewise, four (4) XOR gates and a single AND gate may also be required to produce version check results etc. Alternative to header compare logic hardware shown in FIG. 14A, a look-up table as shown in FIG. 14B may also be utilized. In either situation, the header compare logics may be disabled by the Micro-Engine (ME) 710 and used for either debug purposes or as a fail-safe method if specification changes invalidate hardware comparisons.

Compare Logics for MAC Header Packet Sequence Number (PSN) as previously indicated may be more complex since the PSNs have different sources for comparisons against the cell PSN. Therefore MAC Header PSN Compare Logic may be configured differently from other hardware comparisons to find the relative position of a PSN from the header information of an incoming cell/packet with respect to an expected PSN value. Typically the MAC PSN value may be resolved to be either equal, earlier, or later than the expected PSN based on a modulo $2**N$ PSN number (where N=number of PSN bits).

As previously described with reference to FIGS. 3A–3B a NGIO packet is a collection of control and data defined by a descriptor, which is transferred as a collection of data cells to complete a transaction. Each data packet may consist of between one and a defined maximum number of cells and the descriptor is the blueprint of what is contained in the data packet. An application that is moving data message, via the switched fabric 100' may require multiple descriptors as described with reference to FIGS. 3C–3D for doing the work. Each descriptor is typically assigned a sequential PSN used to keep track of the ordering of data packets as these packets are sent or received. For NGIO Packet Sequence Numbers (PSNs) as described with reference to FIGS. 3A–3B are an 8-bit value ($2^8$=256). The PSNs start at zero (0) for the first packet transmitted on each VI, are incremented as each data packet is generated, and roll over again to zero (0) after transmitting 256 packets in order to allow the host system 130 (target device) to identify packets that were lost while crossing the switched fabric 100' as shown in FIG. 2 and inform the remote system 190 (source device) as to which packet(s) were lost. Therefore the first packet received is expected to be zero (0) and will increment for subsequent packets. Every time an incoming cell is received, via the serial interface 730 (see FIG. 7) the cell PSN (cPSN) must be compared with the PSN context, known as an expected PSN (ePSN) to ensure that cell was expected and work is being done in order. If an incoming cell is not the "expected" cell, then it may fall into one of two categories. For example, if incoming cells with a PSN that are earlier than the expected PSN (ePSN) should not be processed but should generate appropriate responses. Incoming cells with a PSN that are later than the expected PSN (ePSN) are in error and will be handled appropriately. Once a cell has been detected missing, incoming cells with a PSN equal to the expected PSN (ePSN) will restart the processing. Cells continue to be dropped until the arrival of the first cell of a data packet with the expected PSN (ePSN) and the CSN equals to zero (0).

Figure 15:
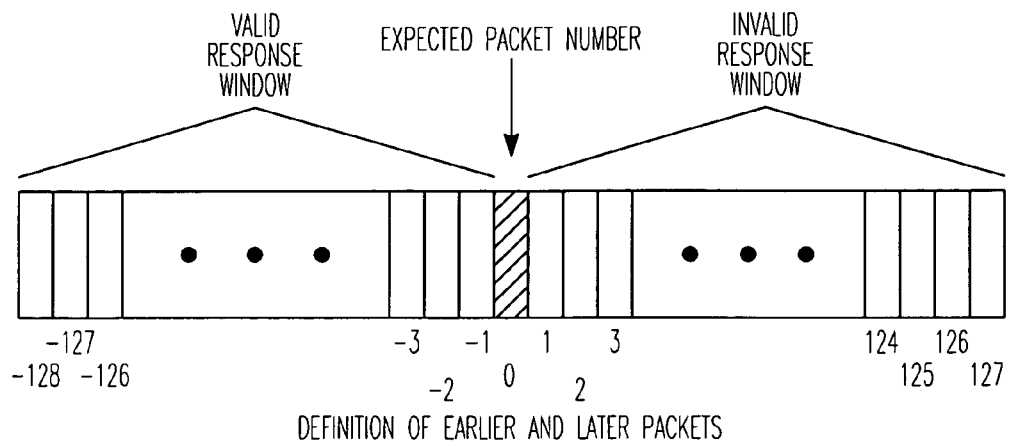
FIG. 15 illustrates an example Window Definition of Earlier and Later packets for determining the relative position of a Packet Sequence Number (PSN) of an incoming packet with respect to an expect Packet Sequence Number (ePSN) according to an embodiment of the present invention.

However, hardware comparisons of the cell PSN (cPSN) and the expected PSN (ePSN) to are significantly more complex since complications occur when the cPSN is not equal to the ePSN. Therefore for NGIO/InfiniBand™ it is important to know the window in which this non-equal PSN lies as shown in FIG. 15. For NGIO the earlier window may be ($2^7$) and the later window may be ($2^7$–1) since NGIO PSNs are an 8-bit value. For InfiniBand™ the earlier window may be ($2^{23}$) and the later window may be ($2^{23}$–1) since InfiniBand™ PSNs are a 24-bit value. In either case, the window may be defined as either an earlier or later (Valid or Invalid) PSN. For purposes of an 8-bit PSN value shown in FIG. 15, if the expected PSN (ePSN) starts at zero (0), then any cPSN that is 127 (256/(2–1)=127) greater than ePSN may be invalid as indicated as "Invalid Response Window". Conversely, any cPSN that is 128 less than ePSN may be valid as indicated as "Valid Response Window."

According to the NGIO Channel Interface Specification, PSNs between expected PSN (ePSN) and ePSN+127 modulo 256 are logically higher (Later) and PSNs between ePSN and (ePSN–128 modulo 256) are logically previous (Earlier). For this reason the PSN Compare Logic must do more than a simple comparison of the cPSN vs. the ePSN. An example of this is when the ePSN=0xF0. A cell PSN (cPSN=0x00) is actually later than the expected PSN, even though it is less than the expected PSN. The PSN Compare Logic takes the cPSN from the context information and the ePSN from the incoming cell as inputs and generates three outputs: PSN Earlier, PSN Later, and PSN Equal.

PSN Range Finder algorithm may be incorporated into Compare Logic hardware or installed in software module, firmware module or comprehensive hardware/software of the Receive FIFO interface 722A to find the PSN range and determine what to do next.

For example, if the packet is the "expected" packet, then the packet is processed normally. However, if the packet is not the "expected" packet, then it falls into the earlier or later window. Cells with a PSN earlier than the "expected" PSN should not be processed but should generate appropriate responses. Cells with a PSN that are later than the "expected" PSN are in error and will be handled appropriately.

PSN Range Finder algorithm may be provided as follows:
Constants:
X=(total # of PSNs)/2
Y=((total # of PSNs)/2–1)
N=number of bits of the PSN
1. If the cell PSN (cPSN) is equal to the ePSN then the equal flag is set.
2. The Start of the Earlier Range (SER) is equal to (ePSN+X) modulo 2\*\*N.
3. If the cPSN is not equal to the ePSN and the ePSN is greater than Y then the cPSN is earlier if it is greater than or equal to the SER and less than the ePSN, otherwise it is later.
4. If the cPSN is not equal to the ePSN and the ePSN is less than or equal to Y then the cPSN is earlier if it is greater than or equal to the SER or less than the ePSN, otherwise it is later.

Figure 16:
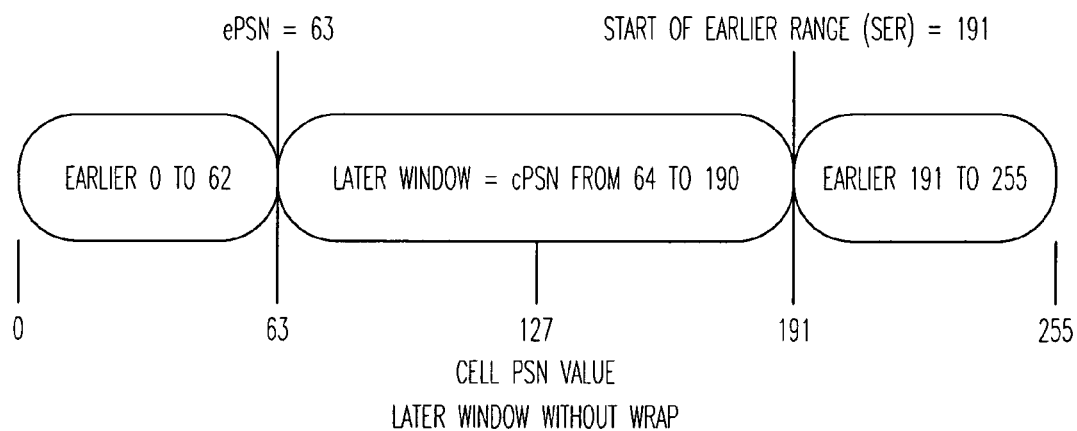
FIG. 16 illustrates an example Later Window without wrap according to an embodiment of the present invention.

The PSN Range Finder algorithm according to an embodiment of the present invention operates on the basis that one of the PSN ranges will not wrap around. In the case of NGIO the wrap around occurs from 255 back to 0, since NGIO PSNs are an 8-bit value. For instance, if the ePSN equals 63 as shown in FIG. 16, then the Later Window range will be from 64 to 190 (64+127=190). The Start of Earlier Range (SER) starts at 191. When the ePSN is less than or equal to 127, the Later Window does not wrap. This means that any cPSN less than the ePSN or greater than the Start of Earlier Range (SER) must be earlier if it is not equal.

Figure 17:
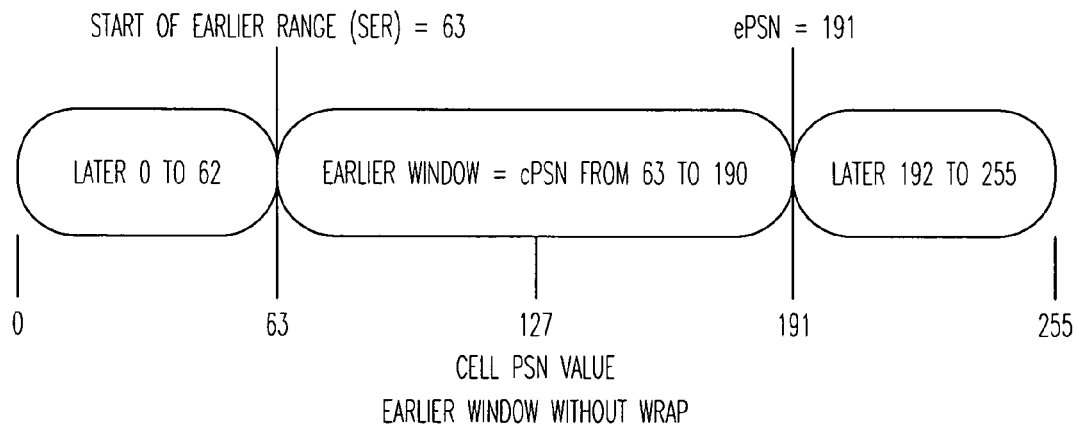
FIG. 17 illustrates an example Earlier Window without wrap according to an embodiment of the present invention.

Another example is shown in FIG. 17. In this situation, if the ePSN equals 191, then the Earlier Window range will be from 63 to 190 which does not wrap. When the ePSN is greater than 127, the Earlier Window does not wrap. This means that any cPSN less than the ePSN and greater than the Start of Earlier Range (SER) must be earlier if it is not equal.

For non-NGIO/InfiniBand™ channels, a similar Window as shown in FIG. 15 may also be defined. The PSN Range Finder algorithm according to an embodiment of the present invention works for any number of PSN bits and with the Earlier Window equal to half the total number of PSNs. The constants used in the PSN Range Finder algorithm can also be adjusted to correct any differences in the Window for protocols other than NGIO/InfiniBand™.

Figure 18:
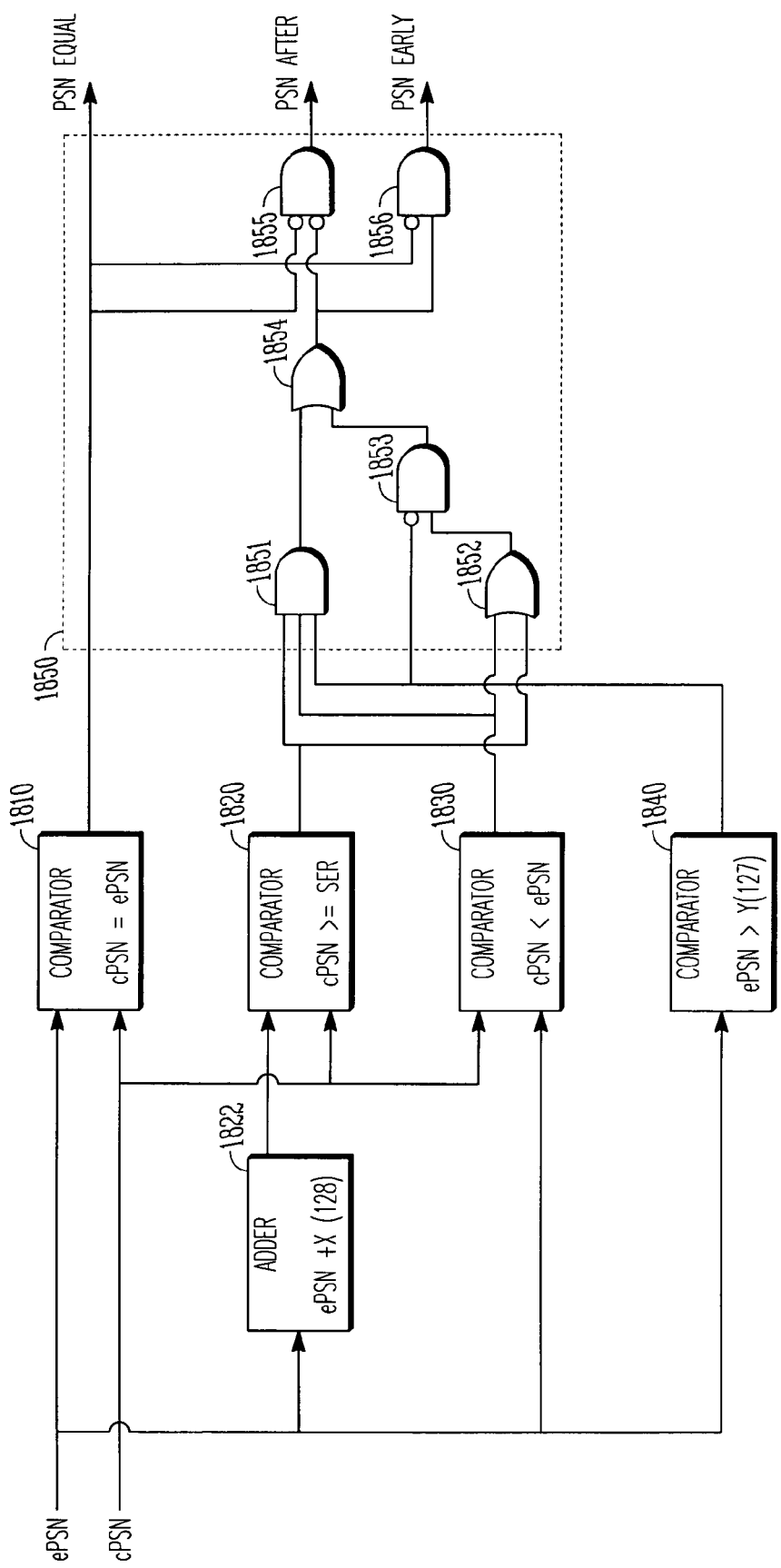
FIG. 18 illustrates an example implementation of Packet Sequence Number (PSN) Compare Logic according to an embodiment of the present invention.

Refer now to FIG. 18, an example implementation of Packet Sequence Number (PSN) Compare Logic according to an embodiment of the present invention is illustrated. As shown in FIG. 18, the PSN Compare Logic may comprise a series of PSN comparators 1810–1840 and a combine logic 1850. The first PSN comparator 1810 may be arranged to compare the ePSN from the incoming packet and the cPSN from the context information and determine whether the cPSN equals to the ePSN. The second PSN comparator 1820 may be arranged to compare the ePSN which has included constant X (total # of PSNs)/2, via an adder 1822 and the cPSN to determine whether the cPSN is greater than or equals to the Start of Earlier Range (SER). The third PSN comparator 1830 may be arranged to compare the ePSN and the cPSN and determine whether the cPSN is less than the ePSN. Likewise, the fourth PSN comparator 1840 may be arranged to compare the ePSN and the cPSN and determine whether the ePSN is greater than constant Y ((total # of PSNs)/2–1). For NGIO constant X will be 128 and constant Y will be 127 since the total number of PSNs is 256. The combine logic 1850 may be arranged to receive PSN comparisons and generate three outputs: PSN Earlier, PSN Later, and PSN Equal.

Each of PSN comparators 1810–1840 may be implemented by a simple XOR gate. However, the combine logic 1850 may also be implemented by combinations of logic gates 1851–1856. For example, a first AND gate 1852 may be arranged to logically combine outputs of the second, third, and fourth PSN comparators 1820–1840. A first OR gate 1852 may be arranged to logically combine outputs of the third and fourth PSN comparators 1830–1840. A second AND gate 1853 may be arranged to logically combine an inverted output of the fourth PSN comparator 1840 and an output of the first OR gate 1852. A second OR gate 1854 may be arranged to receive outputs of the first and second AND gates 1851 and 1853. A third AND gate 1855 may be arranged to receive an inverted output of the first PSN comparator 1810 and an inverted output of the second OR gate 1854 and produce the PSN After. And a fourth AND gate 1856 may be arranged to receive an inverted output of the first PSN comparator 1810 and an output of the second OR gate 1854 and produce the PSN Early.

PSN Range Finder Pseudo-Code representation of the PSN Range Finder algorithm may be shown in the below TABLE hereinbelow:

PSN_Equal = 0
PSN_Later = 0    [DEFAULT VALUE]
PSN_Earlier = 0
Total_number_of_PSNs = 2\*\*N -- (N = total number of PSN bits)
    X = (total_number_of_PSNs)/2
    Y = ((total_number_of_PSNs)/2 – 1)
    if (ePSN = cPSN) then -continued

```
        PSN_Equal = 1
    else if ePSN > Y then
        if (cPSN >= (ePSN + X)) and (cPSN < ePSN) then
            PSN_Earlier = 1
        else
            PSN_Later = 1
        end if;
    else
        if (cPSN >= (ePSN + X)) or (cPSN < ePSN) then
            PSN_Earlier = 1
        else
            PSN_Later = 1
        end if;
    end if.
```

Figure 19:
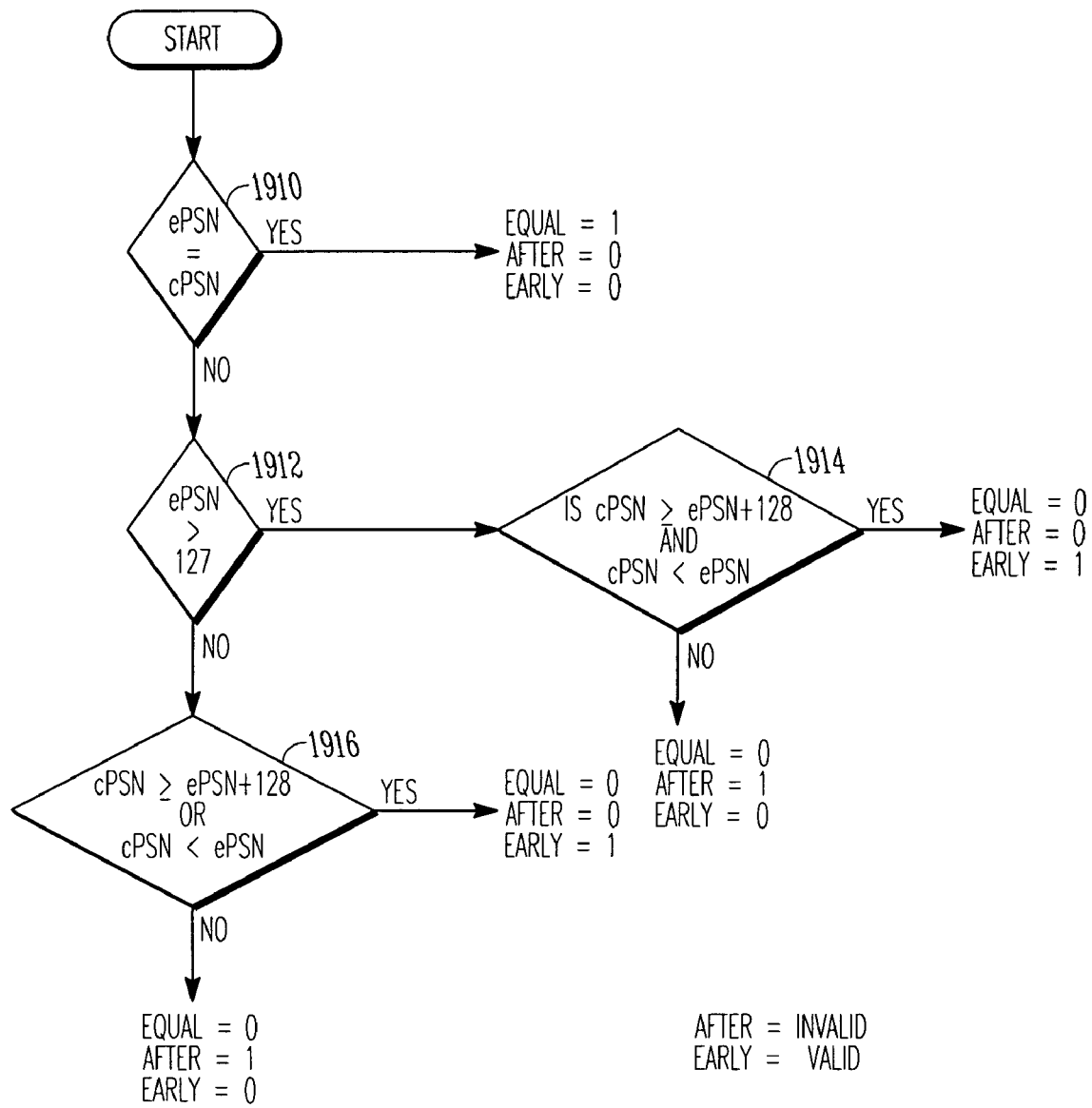
FIG. 19 illustrates an example process of determining the relative position of a Packet Sequence Number (PSN) of an incoming packet with respect to an expect Packet Sequence Number (ePSN) according to an embodiment of the present invention.

FIG. 19 illustrates an example Pseudo-Code process of determining the relative position of a Packet Sequence Number (PSN) of an incoming packet with respect to an expect Packet Sequence Number (ePSN) according to an embodiment of the present invention. The Pseudo-Code may be activated (start) upon receipt of an incoming cell, via the serial interface 730. At block 1910, a determination of whether the ePSN from the incoming cell equals to the cPSN from the context information is made. If the ePSN does not equal to the cPSN, then a determination of whether the ePSN from the incoming cell is greater than constant Y (127) is made at block 1912. However, if the ePSN equals to the cPSN, then:

PSN Equal=1,
PSN After=0, and
PSN Early=0.

If the ePSN from the incoming cell is greater than constant Y (127), then a determination of whether the cPSN is greater than or equal to the ePSN plus 128 AND whether the cPSN is less than the ePSN is made at block 1914. If the cPSN is greater than or equal to the ePSN plus 128 AND the cPSN is less than the ePSN, then:

PSN Equal=0,
PSN After=0, and
PSN Early=1.

In contrast, if the cPSN is NOT greater than or equal to the ePSN plus 128 AND the cPSN is NOT less than the ePSN, then:

PSN Equal=0,
PSN After=1, and
PSN Early=0.

If the ePSN from the incoming cell is NOT greater than constant Y (127), then a determination of whether the cPSN is greater than or equal to the ePSN plus 128 OR whether the cPSN is less than the ePSN is made at block 1916. If the cPSN is greater than or equal to the ePSN plus 128 OR the cPSN is less than the ePSN, then:

PSN Equal=0,
PSN After=0, and
PSN Early=1.

In contrast, if the cPSN is NOT greater than or equal to the ePSN plus 128 OR the cPSN is NOT less than the ePSN, then:

PSN Equal=0,
PSN After=1, and
PSN Early=0.

The main advantages of the PSN Range Finder architecture are as follows: (1) significant gate savings for high speed implementation at low cost; (2) ability to offload Micro-Engine (ME) 710 from MicroCode processing; and (3) parallel operations for MAC header checking. This is because a smaller number of comparators are used to find the Window of the cell PSN (ePSN), when computing the Start of Earlier Range (SER) and determining if the expected PSN is greater than ((total # of PSNs)/2).

In addition, the use of predetermined constants (X and Y) for two of the PSN comparators also decreases the gate count. The approximate gate count of an 8-bit PSN implementation is 180 gates with a gate defined as the area of a 2 input NAND gate. The comparators are also scalable with the number of bits of the PSN, and are configured for parallel and hence faster computations. As a result, faster link speeds and faster host connections are obtained. More importantly, having the PSN Range Finder in hardware allows the results to be computed in parallel with other header checks. This allows the Micro-Engine (ME) 710 to do other work while the header checks are being completed. An example of this is show in the example Hardware Assisted Cell Processing Pseudo-Code as previously described. If PSN checks are done alone in hardware and in parallel, the total processing time of the header information may be reduced by 10 clocks as provided hereinbelow:

Clock Instruction
1. Load MAC Header into Compare Register—Get the Cell and Context values.
2. Load Context values into Compare Register—Loaded into Comparators to start checking.
   At this time the Micro-Engine (ME) can perform other tasks not related to header.
   Checking or wait for a clock to get results of hardware assisted comparisons.
3. NOP
4. Is Header Check complete without Errors.
5. If TRUE continue, else go to Bad_Header.

During the NOP cycle the PSN Compare Logic hardware is doing the calculations and preparing the PSN check results for the Micro-Engine (ME) 710 to poll in the next clock. Since all of the hardware PSN checks are done in parallel, the results are known at the same time, not in a sequential order like the MicroCode cell processing.

As described with reference to FIGS. 10, 12, 13A, 13B, 14A, and 14B, the Receiver FIFO Hardware Assist (HWA) mechanism according to an embodiment of the present invention has a low gate count and is expandable as well as scalable. All header checks and comparisons are implemented in hardware and performed in parallel with each other while offloading the Micro-Engine (ME) 710 from having to spend considerable clocks to process the cell/packet header. This allows the Micro-Engine (ME) 710 to do other work while header checks are being completed. As a result, ME performance can be enhanced and latency can be decreased significantly.

Figure 20:
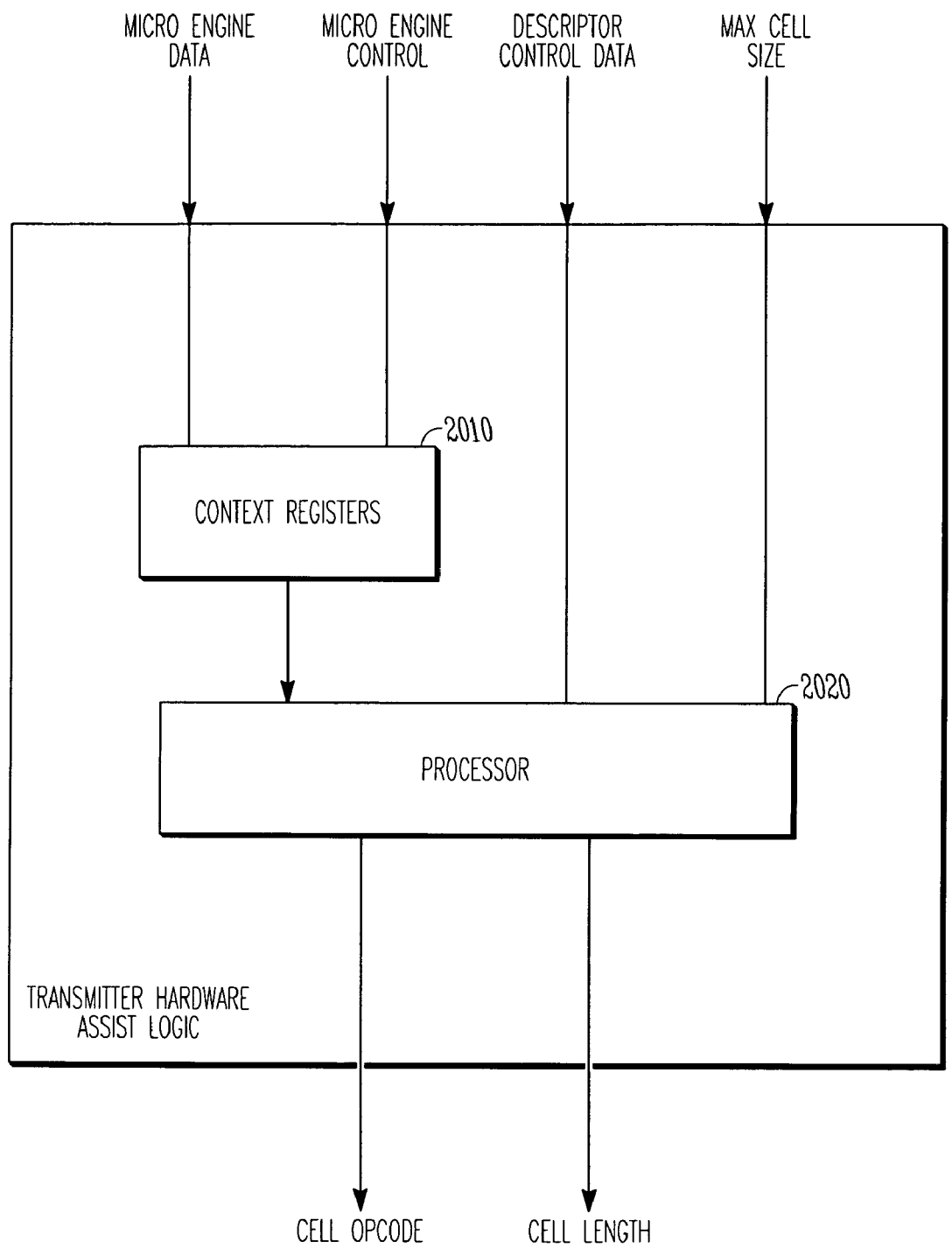
FIG. 20 illustrates an example Transmitter Hardware Assist (HWA) mechanism for simultaneously computing both OpCode and Length fields of a cell/packet header according to an embodiment of the present invention.

FIG. 20 illustrates an example Transmitter MAC Header Hardware Assist (HWA) Mechanism according to an embodiment of the present invention. Such a Transmitter MAC Header Hardware Assist (HWA) Mechanism may be incorporated into the local bus interface 718 to generate cell OpCode and cell Length fields for an NGIO cell, as shown in FIGS. 3A–3B, while an entire cell is being built or assembled for transmission, via the serial interface 730 so as to offload the Micro-Engine (ME) 710 from Micro-Code processing. The Transmitter MAC Header Hardware Assist (HWA) Mechanism uses information stored in the context memory and descriptors from the host system 130 to compute the cell OpCode and cell Length fields of a cell simultaneously. As described with reference to FIGS. 3A–3B, the OpCode field defines the operation of each cell as a send, RDMA write, RMDA read, or response cell. The Length field is defined as the number of bytes in the cell including the MAC Header, RDMA control information, immediate data, acknowledge information, and the payload data. Similar OpCode and Length fields exist for InfiniBand™ packet headers.

As shown in FIG. 20, the Transmitter MAC Header Hardware Assist (HWA) Mechanism may comprise context registers 2010 and a cell/packet processor 2020. The context registers 2010 may be loaded with context information pertaining to a cell/packet as soon as the Micro-Engine (ME) 710 is scheduled to build or assemble an entire cell/packet. The cell/packet processor 1230 may then take the context information, the maximum call size information, and control information from a descriptor posted as shown in FIGS. 3C–3D and determine the OpCode and Length fields of a cell/packet to be transmitted via the serial interface 730.

In one implementation of the Transmitter MAC Header Hardware Assist (HWA) Mechanism, 4.5 bytes of context registers are utilized. 4 of these bytes are the number of cell bytes remaining to be transmitted and 4 bits are control information. The cell context registers are loaded by Micro-Code while working on the cell/packet to be transmitted.

Data for the cell/packet processor also comes from a descriptor posted by host software to describe how the cell/packet is to be constructed. Typically the Micro-Engine (ME) reads the descriptor from the host system 130, decodes the control field of the descriptor as shown in FIGS. 3C–3D, and passes the control information to the cell/packet processor 2020. The last information needed is the maximum cell size which is typically obtained from a configuration register (not shown).

The cell/packet processor 2020 of the Transmitter MAC Header Hardware Assist (HWA) Mechanism may be implemented as part of an Application Specific Integrated Circuit (ASIC). For example, the cell/packet processor 2020 may comprise logic gates and a look-up table which take the inputs and perform the following functions:

(1) Computes Payload Length—The payload length is equal to the maximum cell size until the cell bytes remaining for transmission is less than the maximum, then the payload length is equal to the cell bytes remaining.
(2) Computes Number of Bytes other than Payload—Some OpCodes contain data other than MAC Header and Payload. This includes RDMA information, acknowledge information, and Immediate Data. This extra amount is added to the cell Length.
(3) Computes OpCode—The cell bytes remaining, context register inputs, and descriptor control information provide enough information to encode the OpCode that will go into the cell header.
(4) Store results for both tasks—For multi-tasking Micro-Engine (ME) OpCode and Length are calculated and stored off in task associated registers that are selected by the Micro-Engine (ME).

The outputs of the cell/packet processor 2020 are the OpCode and Length fields of the cell/packet which values will be loaded into a cell buffer (not shown) by MicroCode when the cell/packet is being assembled for transmission, via the serial interface 730.

OpCode and Length Finder algorithms may be incorporated into the cell/packet processor logic hardware or installed in software module, firmware module or comprehensive hardware/software of the local bus interface 718 to determine the OpCode and Length fields of a cell/packet simultaneously.

Figure 21:
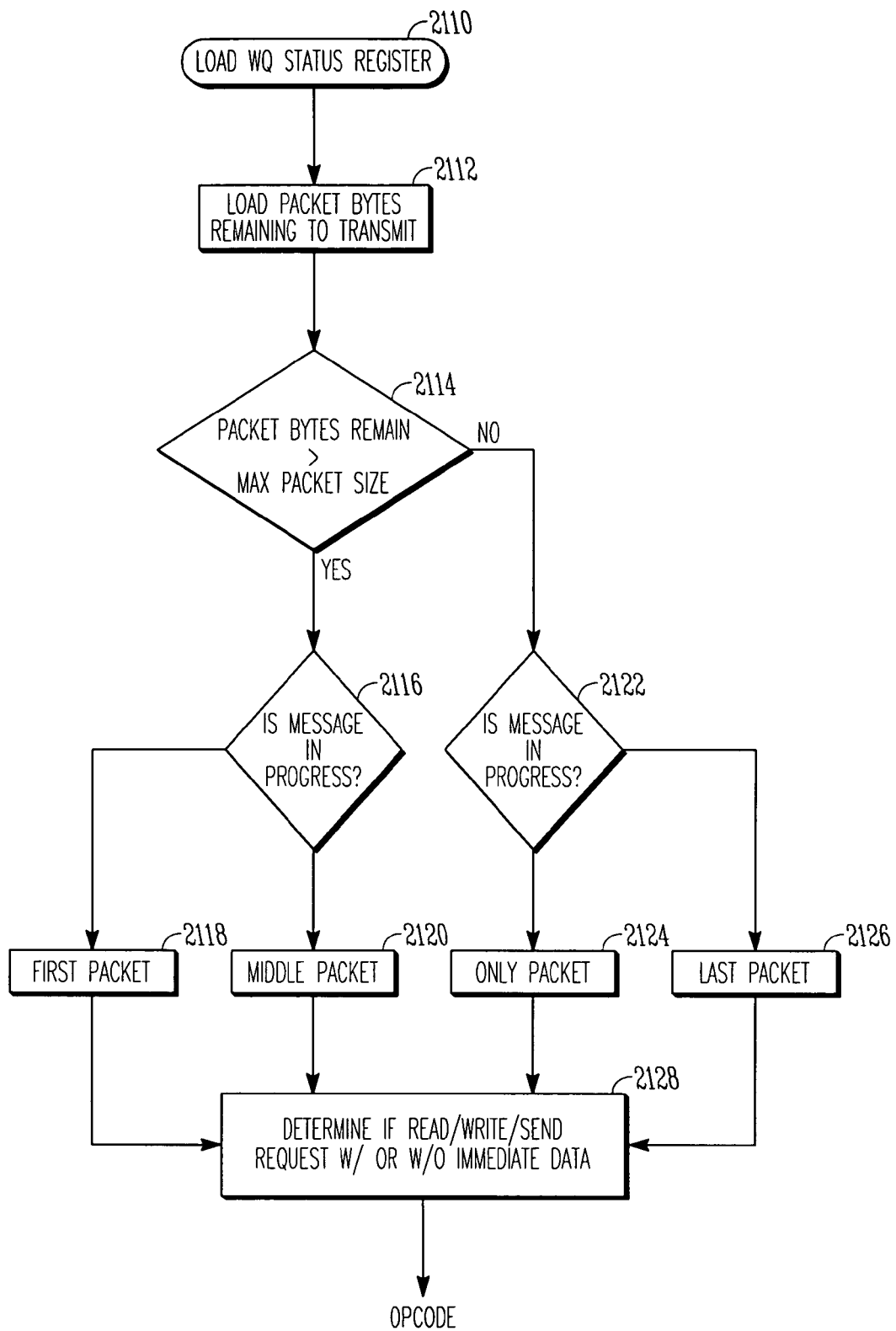
FIG. 21 illustrates an example process of determining an OpCode field of a cell/packet header according to an embodiment of the present invention.
Figure 22:
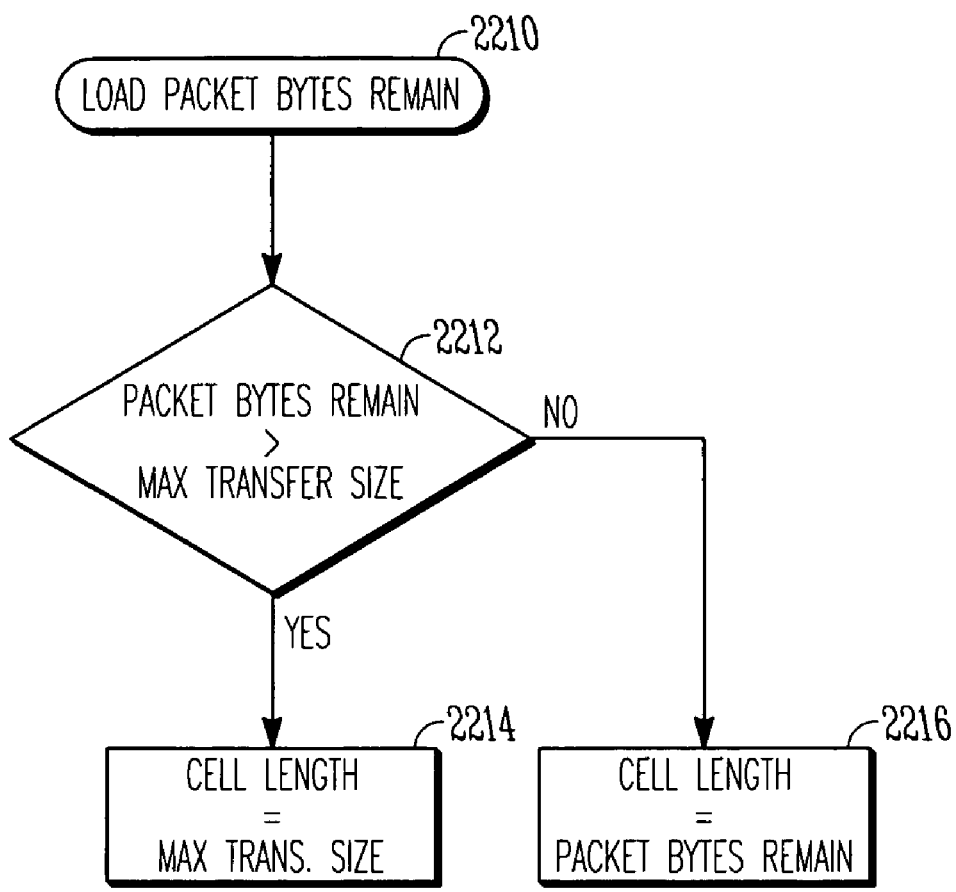
FIG. 22 illustrates an example process of determining a Length field of a cell/packet header according to an embodiment of the present invention.

FIGS. 21 and 22 illustrate example flowcharts of determining the cell OpCode and cell Length of an NGIO cell respectively according to an embodiment of the present invention. However, similar flowcharts exist for determining OpCode and Length fields of an InfiniBand™ packet. As shown in FIG. 21, the work queue (WQ) status information from a WP status register (not shown) and the packet bytes remaining to transmit may be loaded into the Transmitter MAC Header Hardware Assist (HWA) Mechanism at steps 2110 and 2112. The cell/packet processor 2020 may then determine whether packet bytes remaining to transmit are greater than the maximum packet size based on the maximum transfer size at step 2114.

If the packet bytes remaining to transmit are greater than the maximum packet size, then the cell/packet processor 2020 determines whether there is a message in progress at step 2116. If there is no message in progress at step 2116, then the packet bytes remain indicates a first packet at step 2118. If there is a message in progress at step 2116, then the packet bytes remain indicates a middle packet at step 2120.

If the packet bytes remaining to transmit are not greater than the maximum packet size, then the cell/packet processor 2020 also determines whether there is a message in progress at step 2122. If there is no message in progress at step 2122, then the packet bytes remain indicates the only packet at step 2124. If there is a message in progress at step 2122, then the packet bytes remain to transmit indicates a last packet at step 2126.

When the packet bytes remain to transmit indicates either a first, middle, only, or last packet, then the cell/packet processor 2020 determines if a Read, Write, or Send request with or without Immediate Data is associated with the packet bytes remain at step 2128. Based on the Read, Write, or Send request with or without Immediate Data associated with the packet bytes, the cell/packet processor 2020 then generates a cell OpCode.

Simultaneously to the process of determining the cell OpCode is the process of determining the cell Length as shown in FIG. 22. After the packet bytes remaining to transmit are loaded at step 2210, the cell/packet processor 2020 also determines if the packet bytes remaining to transmit are greater than the maximum transfer size at step 2112. If the packet bytes remaining to transmit are greater than the maximum transfer size, then the cell/packet processor 2020 determines that the cell Length equals to the maximum transfer size at step 2214. If the packet bytes remaining to transmit are not greater than the maximum transfer size, then the cell/packet processor 2020 determines that the cell Length equals to the packet bytes remain at step 2216.

When the OpCode and Length fields of a cell header are determined, the OpCode and Length fields may be loaded into a cell buffer (not shown) for cell construction with other header information before a cell/packet is scheduled for transmission, via the serial interface 730.

The main advantages of the Transmitter MAC Header Hardware Assist Mechanism are as follows: (1) significant gate savings for high speed implementation at low cost; (2) ability to offload Micro-Engine (ME) 710 from MicroCode processing; and (3) parallel operations for MAC Header construction. This is because both the OpCode and Length fields are computed simultaneously.

As described from the foregoing, the host-fabric adapter installed at a host system in a data network using a channel-based, switched fabric architecture according to an embodiment of the present invention effectively manages NGIO/InfiniBand™ channels and support data movement operations between communication devices at a host system or between host systems connected together directly or via a data network using a channel-based, switched fabric architecture. The host-fabric adapter is optimized for NGIO/InfiniBand™ functionality with minimal hardware investment, including controlling execution of NGIO/InfiniBand™ protocols with minimal pipelining. Micro-control subsystem of the host-fabric adapter is designed to control execution of NGIO/InfiniBand™ protocols with minimal pipelining, and to control overall NGIO/InfiniBand™ cell/packet processing with minimum latency.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO), Future I/O (FIO), InfiniBand™ and Server Net, and a LAN system including Ethernet, FDDI (Fiber Distributed Data Interface) Token Ring LAN, Asynchronous Transfer Mode (ATM) LAN, Fiber Channel, and Wireless LAN. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host-fabric adapter installed at a host system for connecting to a switched fabric of a data network, comprising:
   a Micro-Engine (ME) arranged to establish connections and support data transfers via said switched fabric;
   a serial interface arranged to receive and transmit data packets from said switched fabric for data transfers;
   a host interface arranged to receive and transmit host data transfer requests, in the form of descriptors, from said host system for data transfers;
   a first-in/first-out (FIFO) interface arranged to receive and transmit data packets to/from said switched fabric via said serial interface, and incorporated therein a Receiver Header Hardware Assist (HWA) Mechanism configured to check header information of incoming data packets host descriptors for header errors so as to offload said Micro-Engine (ME) from having to check for said header errors,
   wherein said Receiver Header Hardware Assist (HWA) mechanism comprises:
      context registers loaded with context information pertaining to an incoming data packet; header registers loaded with header information of the incoming data packet; and
      a processor arranged to execute header checks and comparisons of the header information and the context information and determine whether the incoming data packet is good, and
   wherein said header checks and comparisons include (1) Version Compare which is a comparison of the context version and the packet version; (2) Priority Compare which is a comparison of the context priority and the packet priority; (3) Source Address Compare which is a comparison of the context destination address and the source address; (4) Source Work Queue Compare which is a comparison of the context destination work queue (WQ) and the source work queue (WQ) number; (5) Port Compare which is a comparison of the context port value and the port the packet was received on; (6) Channel Configuration Check which is a comparison of the OpCode and the context channel configuration type; (7) OpCode Consistency Check which is a comparison of the OpCode with context information; (8) Length Consistency Check which is a comparison of the OpCode with the Length to ensure the length is in the acceptable range for that OpCode; (9) Read Permission Check which is a comparison of the OpCode with the context read permission bit; (10) Write Permission Check which is a comparison of the OpCode with the context write permission bit; (11) Cell Sequence Number Check (CSN) which is a comparison of the received CSN and the context expected CSN; and (12) Packet Sequence Number (PSN) Check which is a comparison of the received PSN with the context expected PSN based to find the relative position of the PSN.

2. A host-fabric adapter installed at a host system for connecting to a switched fabric of a data network, comprising:
   a Micro-Engine (ME) arranged to establish connections and support data transfers via said switched fabric;
   a serial interface arranged to receive and transmit data packets from said switched fabric for data transfers;
   a host interface arranged to receive and transmit host data transfer requests, in the form of descriptors, from said host system for data transfers;
   a first-in/first-out (FIFO) interface arranged to receive and transmit data packets to/from said switched fabric via said serial interface, and incorporated therein a Receiver Header Hardware Assist (HWA) Mechanism configured to check header information of incoming data packets host descriptors for header errors so as to offload said Micro-Engine (ME) from having to check for said header errors,
   wherein said Receiver Header Hardware Assist (HWA) mechanism comprises:
      context registers loaded with context information pertaining to an incoming data packet; header registers loaded with header information of the incoming data packet; and
      a processor arranged to execute header checks and comparisons of the header information and the context information and determine whether the incoming data packet is good, and
   wherein said Receiver Header Hardware Assist (HWA) Mechanism first loads the header information of an incoming data packet and the corresponding context information and then processes in parallel all header checks and comparisons at the same time to determine whether the incoming data packet is "good", including compare the context version with the cell/packet version, compare the context priority with the cell/packet priority, compare the context destination address with the source address of the incoming cell/packet, compare the context destination work queue (WQ) number with the source work queue (WQ) number of the incoming cell/packet, compare the context port value with the port the incoming cell/packet was received, check for channel configuration error, check for OpCode consistency, check for length consistency, check for read permission, check for write permission, check for Cell Sequence Number (CSN) and check for Packet Sequence Number (PSN).

3. The host-fabric adapter as claimed in claim 2, wherein said Receiver FIFO Hardware Assist (HWA) mechanism may be implemented as an Application Specific Integrated Circuit (ASIC).

4. The host-fabric adapter as claimed in claim 3, wherein said processor of the Receiver FIFO Hardware Assist (HWA) mechanism comprises:
   different sets of header comparators arranged to process in parallel all header checks and comparisons; and
   a combine logic arranged to indicate whether an incoming data packet is good based on header check results.

5. The host-fabric adapter as claimed in claim 4, wherein said combine logic corresponds to an AND gate which responds to all header check results and, if all those header check results are successful, generates an indication that the incoming data packet is "good", and alternatively, generates an indication that the incoming data packet is "bad" if any of those header check results is unsuccessful.

6. The host-fabric adapter as claimed in claim 4, wherein said processor further comprises:
   an Error Status Register connected to output lines of the header comparators to register as error status bits if any one of those header check results is unsuccessful; and
   a Multiplexer arranged to produce ME readable data to enable said Micro-Engine (ME) to determine the error status registered.

7. The host-fabric adapter as claimed in claim 4, wherein said header comparators comprise a series of Compare Logics, including XOR gates and AND gates arranged in parallel to make comparisons between the context version with the cell/packet version of an incoming cell/packet, the context priority with the cell/packet priority, the context destination address with the source address of the incoming cell/packet, the context destination work queue (WQ) number with the source work queue (WQ) number of the incoming cell/packet, the context port value with the port the incoming cell/packet was received, and check for channel configuration error, read permission, write permission, and Cell Sequence Number (CSN).

8. The host-fabric adapter as claimed in claim 4, wherein one set of header comparators includes a Packet Sequence Number (PSN) Compare Logic configured to find the relative position of a PSN of an incoming data packet with respect to an expected PSN (ePSN).

9. The host-fabric adapter as claimed in claim 8, wherein said PSN Compare Logic comprises:
   a first PSN comparator arranged to compare the ePSN from the incoming data packet and the context PSN (cPSN) from the context information and determine whether the cPSN equals to the ePSN;
   a second PSN comparator arranged to compare the ePSN which has included a constant X (total # of PSNs)/2, and the cPSN to determine whether the cPSN is greater than or equals to a Start of Earlier Range (SER);
   a third PSN comparator arranged to compare the ePSN and the cPSN and determine whether the cPSN is less than the ePSN;
   a fourth PSN comparator arranged to compare the ePSN and the cPSN and determine whether the ePSN is greater than a constant Y ((total # of PSNs)/2−1); and
   a combine logic arranged to receive PSN comparisons and generate three outputs, including a PSN Earlier, a PSN Later, and a PSN Equal.

10. The host-fabric adapter as claimed in claim 9, wherein said first to fourth PSN comparators correspond to XOR gates, and said combine logic comprises:
    a first AND gate arranged to logically combine outputs of the second, third, and fourth PSN comparators;
    a first OR gate arranged to logically combine outputs of the third and fourth PSN comparators;
    a second AND gate arranged to logically combine an inverted output of the fourth PSN comparator and an output of the first OR gate;
    a second OR gate arranged to receive outputs of the first and second AND gates;
    a third AND gate arranged to receive an inverted output of the first PSN comparator and an inverted output of the second OR gate and produce the PSN After; and
    a fourth AND gate arranged to receive an inverted output of the first PSN comparator and an output of the second OR gate and produce the PSN Early.

11. A host-fabric adapter installed at a host system for connecting to a switched fabric of a data network, comprising:
    a Micro-Engine (ME) arranged to establish connections and support data transfers via said switched fabric;
    a serial interface arranged to receive and transmit data packets from said switched fabric for data transfers;
    a host interface arranged to receive and transmit host data transfer requests, in the form of descriptors, from said host system for data transfers;
    a first-in/first-out (FIFO) interface arranged to receive and transmit data packets to/from said switched fabric via said serial interface, and incorporated therein a Receiver Header Hardware Assist (HWA) Mechanism configured to check header information of incoming data packets host descriptors for header errors so as to offload said Micro-Engine (ME) from having to check for said header errors;
    an address translation interface which provides an interface for address translation, and which is addressable by write data and system controls from said Micro-Engine (ME), via a system data bus and a system control bus;
    a context memory which provides an interface to a context manager, and which is addressable by write data and system controls from said Micro-Engine (ME), via said system data bus and said system control bus, for providing the necessary context for a work queue pair used for sending and receiving data packets;
    a local bus interface which provides an interface to a local bus, and which is addressable by write data and system controls from said Micro-Engine (ME), via said system data bus and said system control bus, for supporting system accessible context connections and data transfers; and
    a completion queue/doorbell manager interface which provides an interface to completion queues, and doorbell and memory registration rules, and which is addressable by write data and system controls from said Micro-Engine (ME), via said system data bus and said system control bus;
    wherein said local bus interface incorporates therein a Transmitter Header Hardware Assist (HWA) Mechanism configured to generate OpCode and Length fields for an outgoing packet when an entire packet is being assembled for transmission, via the serial interface so as to offload said Micro-Engine (ME) from MicroCode processing.

12. The host-fabric adapter as claimed in claim 11, wherein said Transmitter Header Hardware Assist (HWA) Mechanism is configured to compute the OpCode and Length fields of a data packet simultaneously using context information and descriptors from a host system.

13. The host-fabric adapter as claimed in claim 12, wherein said Transmitter Header Hardware Assist (HWA) Mechanism comprises:
   context registers loaded with context information pertaining to a packet to be assemble for transmission, via the serial interface; and
   a processor arranged to determine the OpCode and Length fields of a data packet based on the context information, the maximum call size information, and control information from a descriptors posted.

14. The host-fabric adapter as claimed in claim 13, wherein said processor comprises logic gates and a look-up table which take the inputs and perform the following functions: (1) Computes Payload Length; (2) Computes Number of Bytes other than Payload; (3) Computes the OpCode; and (4) Store results in task associated registers selectable by said Micro-Engine (ME).

15. The host-fabric adapter as claimed in claim 12, wherein said Transmitter Header Hardware Assist (HWA) Mechanism computes the OpCode of a data packet by:
   loading work queue (WQ) status information from a WP status register, and the packet bytes remaining to transmit;
   determining whether packet bytes remaining to transmit are greater than a maximum packet size based on a maximum transfer size;
   when the packet bytes remaining to transmit are greater than the maximum packet size, determining whether there is a message in progress;
   if there is no message in progress, indicating the packet bytes remain as a first packet;
   if there is a message in progress, indicating the packet bytes remain as a middle packet;
   when the packet bytes remaining to transmit are not greater than the maximum packet size, also determining whether there is a message in progress;
   if there is no message in progress, indicating the packet bytes remain as the only packet;
   if there is a message in progress, indicating the packet bytes remain as a last packet; and
   determining if a Read, Write, or Send request with or without Immediate Data is associated with the packet bytes remain, and generating the OpCode based on the Read, Write, or Send request with or without Immediate Data associated with the packet bytes.

16. The host-fabric adapter as claimed in claim 15, wherein said Transmitter Header Hardware Assist (HWA) Mechanism computes the Length of a data packet simultaneously with computation of the OpCode by:
   determining if the packet bytes remaining to transmit are greater than a maximum transfer size, after the packet bytes remaining to transmit are loaded;
   if the packet bytes remaining to transmit are greater than the maximum transfer size, indicating that the Length equals to the maximum transfer size; and
   if the packet bytes remaining to transmit are not greater than the maximum transfer size, indicating that the Length equals to the packet bytes remain.

17. The host-fabric adapter as claimed in claim 16, wherein said OpCode and Length fields of a data packet are subsequently loaded into a packet buffer for packet construction with other header information before said data packet is scheduled for transmission, via the serial interface.

18. The host-fabric adapter as claimed in claim 11, wherein said Micro-Engine (ME) comprises:
   one or more Data Multiplexers arranged to supply appropriate interface data based on an ME instruction;
   an Instruction Memory arranged to provide said ME instruction based on downloadable microcode;
   an Arithmetic Logic Unit (ALU) arranged to perform mathematical, logical and shifting operations, and supply write data to the host interface, the address translation interface, the context memory interface, the local bus interface, the completion queue/doorbell manager interface, the Receive FIFO interface and the Transmit FIFO interface, via said system write data bus; and
   an Instruction Decoder arranged to supply system controls to the host interface, the address translation interface, the context memory interface, the local bus interface, the completion queue/doorbell manager interface, the Receive FIFO interface and the Transmit FIFO interface, via said system control bus, to execute said ME instruction from said Instruction Memory to control operations of said Data Multiplexers, and to determine functions of said Arithmetic Logic Unit (ALU).

19. The host-fabric adapter as claimed in claim 18, wherein said Instruction Memory corresponds to a static random-access-memory (SRAM) provided to store Micro-Code that are downloadable for providing said ME instruction to said Instruction Decoder.

20. A host-fabric adapter installed at a host system for connecting to a switched fabric of a data network, comprising:
   a Micro-Engine (ME) arranged to establish connections and support data transfers via said switched fabric;
   a serial interface arranged to receive and transmit data packets from said switched fabric for data transfers;
   a host interface arranged to receive and transmit host data transfer requests, in the form of descriptors, from said host system for data transfers;
   a first-in/first-out (FIFO) interface arranged to receive and transmit data packets to/from said switched fabric via said serial interface; and
   a Transmitter Header Hardware Assist (HWA) Mechanism configured to generate OpCode and Length fields for an outgoing data packet when an entire data packet is being assembled for transmission, via the serial interface so as to offload said Micro-Engine (ME) from having to build all data packets for data transfers.

21. The host-fabric adapter as claimed in claim 20, wherein said Transmitter Header Hardware Assist (HWA) Mechanism computes the OpCode and Length fields of a data packet simultaneously using context information and descriptors from a host system.

22. The host-fabric adapter as claimed in claim 21, wherein said Transmitter Header Hardware Assist (HWA) Mechanism comprises:
   context registers loaded with context information pertaining to a packet to be assemble for transmission, via the serial interface; and
   a processor arranged to determine the OpCode and Length fields of a data packet based on the context information, the maximum call size information, and control information from a descriptors posted.

23. The host-fabric adapter as claimed in claim 22, wherein said processor comprises logic gates and a look-up table which take the inputs and perform the following functions: (1) Computes Payload Length; (2) Computes Number of Bytes other than Payload; (3) Computes the OpCode; and (4) Store results in task associated registers selectable by said Micro-Engine (ME).

24. The host-fabric adapter as claimed in claim 21, wherein said Transmitter Header Hardware Assist (HWA) Mechanism computes the OpCode of a data packet by:
   loading work queue (WQ) status information from a WP status register, and the packet bytes remaining to transmit, via the serial interface;
   determining whether packet bytes remaining to transmit are greater than a maximum packet size based on a maximum transfer size;
   when the packet bytes remaining to transmit are greater than the maximum packet size, determining whether there is a message in progress;
   if there is no message in progress, indicating the packet bytes remain as a first packet;
   if there is a message in progress, indicating the packet bytes remain as a middle packet;
   when the packet bytes remaining to transmit are not greater than the maximum packet size, also determining whether there is a message in progress;
   if there is no message in progress, indicating the packet bytes remain as the only packet;
   if there is a message in progress, indicating the packet bytes remain as a last packet; and
   determining if a Read, Write, or Send request with or without Immediate Data is associated with the packet bytes remain, and generating the OpCode based on the Read, Write, or Send request with or without Immediate Data associated with the packet bytes.

25. The host-fabric adapter as claimed in claim 24, wherein said Transmitter Header Hardware Assist (HWA) Mechanism computes the Length of a data packet simultaneously with computation of the OpCode by:
   determining if the packet bytes remaining to transmit are greater than a maximum transfer size, after the packet bytes remaining to transmit are loaded;
   if the packet bytes remaining to transmit are greater than the maximum transfer size, indicating that the Length equals to the maximum transfer size; and
   if the packet bytes remaining to transmit are not greater than the maximum transfer size, indicating that the Length equals to the packet bytes remain.

26. The host-fabric adapter as claimed in claim 25, wherein said OpCode and Length fields of a data packet are subsequently loaded into a packet buffer for packet construction with other header information before said data packet is scheduled for transmission, via the serial interface.

27. The host-fabric adapter as claimed in claim 20, wherein said host interface, said serial interface and said Micro-Engine (ME) are configured in accordance with the "*Virtual Interface (VI) Architecture Specification*", the "*Next Generation Input/Output (NGIO) Specification*" and the "*InfiniBand™ Specification*".

28. A host-fabric adapter, comprising:
   a Micro-Engine (ME) arranged to establish connections and support data transfers via a switched fabric;
   a serial interface arranged to receive and transmit data packets from said switched fabric for data transfers;
   a host interface arranged to receive and transmit host data transfer requests, in the form of descriptors, from said host system for data transfers;
   a Receiver Header Hardware Assist (HWA) Mechanism configured to check header information of incoming data packets host descriptors for header errors so as to offload said Micro-Engine (ME) from having to check for said header errors; and
   a Transmitter Header Hardware Assist (HWA) Mechanism configured to generate OpCode and Length fields for an outgoing data packet when an entire data packet is being assembled for transmission, via the serial interface, so as to offload said Micro-Engine (ME) from having to build all data packets for data transfers.

29. The host-fabric adapter as claimed in claim 28, wherein said Receiver Header Hardware Assist (HWA) Mechanism loads the header information of an incoming data packet and the corresponding context information and then processes in parallel all header checks and comparisons at the same time to determine whether the incoming data packet is "good", including compare the context version with the cell/packet version, compare the context priority with the cell/packet priority, compare the context destination address with the source address of the incoming cell/packet, compare the context destination work queue (WQ) number with the source work queue (WQ) number of the incoming cell/packet, compare the context port value with the port the incoming cell/packet was received, check for channel configuration error, check for OpCode consistency, check for Length consistency, check for read permission, check for write permission, check for Cell Sequence Number (CSN) and check for Packet Sequence Number (PSN).

30. The host-fabric adapter as claimed in claim 29, wherein said Receiver Header Hardware Assist (HWA) mechanism comprises:
   context registers loaded with context information pertaining to an incoming data packet;
   header registers loaded with header information of the incoming data packet; and
   a processor arranged to execute header checks and comparisons of the header information and the context information and determine whether the incoming data packet is "good".

31. The host-fabric adapter as claimed in claim 30, wherein said processor of the Receiver FIFO Hardware Assist (HWA) mechanism comprises:
   different sets of header comparators arranged to process in parallel all header checks and comparisons; and
   a combine logic arranged to indicate whether an incoming data packet is good based on header check results.

32. The host-fabric adapter as claimed in claim 31, wherein said combine logic corresponds to an AND gate which responds to all header check results and, if all those header check results are successful, generates an indication that the incoming data packet is "good", and alternatively, generates an indicate that the incoming data packet is "bad" if any of those header check results is unsuccessful.

33. The host-fabric adapter as claimed in claim 32, wherein said processor further comprises:
   an Error Status Register connected to output lines of the header comparators to register as error status bits if any one of those header check results is unsuccessful; and
   a Multiplexer arranged to produce ME readable data to enable said Micro-Engine (ME) to determine the error status registered.

34. The host-fabric adapter as claimed in claim 31, wherein one set of header comparators includes a Packet Sequence Number (PSN) Compare Logic configured to find the relative position of a PSN of an incoming data packet with respect to an expected PSN (ePSN).

35. The host-fabric adapter as claimed in claim 34, wherein said PSN Compare Logic comprises:

a first PSN comparator arranged to compare the ePSN from the incoming data packet and the context PSN (cPSN) from the context information and determine whether the cPSN equals to the ePSN;

a second PSN comparator arranged to compare the ePSN which has included a constant X (total # of PSNs)/2, and the cPSN to determine whether the cPSN is greater than or equals to a Start of Earlier Range (SER);

a third PSN comparator arranged to compare the ePSN and the cPSN and determine whether the cPSN is less than the ePSN;

a fourth PSN comparator arranged to compare the ePSN and the cPSN and determine whether the ePSN is greater than a constant Y ((total # of PSNs)/2−1); and a combine logic arranged to receive PSN comparisons and generate three outputs, including a PSN Earlier, a PSN Later, and a PSN Equal.

36. The host-fabric adapter as claimed in claim 35, wherein said first to fourth PSN comparators correspond to XOR gates, and said combine logic comprises:

a first AND gate arranged to logically combine outputs of the second, third, and fourth PSN comparators;

a first OR gate arranged to logically combine outputs of the third and fourth PSN comparators;

a second AND gate arranged to logically combine an inverted output of the fourth PSN comparator and an output of the first OR gate;

a second OR gate arranged to receive outputs of the first and second AND gates;

a third AND gate arranged to receive an inverted output of the first PSN comparator and an inverted output of the second OR gate and produce the PSN After; and a fourth AND gate arranged to receive an inverted output of the first PSN comparator and an output of the second OR gate and produce the PSN Early.

37. The host-fabric adapter as claimed in claim 28, wherein said Transmitter Header Hardware Assist (HWA) Mechanism is configured to compute the OpCode and Length fields of a data packet simultaneously using context information and descriptors from a host system.

38. The host-fabric adapter as claimed in claim 37, wherein said Transmitter Header Hardware Assist (HWA) Mechanism comprises:

context registers loaded with context information pertaining to a packet to be assemble for transmission, via the serial interface; and a processor arranged to determine the OpCode and Length fields of a data packet based on the context information, the maximum call size information, and control information from a descriptors posted.

39. The host-fabric adapter as claimed in claim 38, wherein said processor comprises logic gates and a look-up table which take the inputs and perform the following functions: (1) Computes Payload Length; (2) Computes Number of Bytes other than Payload; (3) Computes the OpCode; and (4) Store results in task associated registers selectable by said Micro-Engine (ME).

40. The host-fabric adapter as claimed in claim 28, wherein said Transmitter Header Hardware Assist (HWA) Mechanism computes the OpCode of a data packet by:

loading work queue (WQ) status information from a WP status register, and the packet bytes remaining to transmit;

determining whether packet bytes remaining to transmit are greater than a maximum packet size based on a maximum transfer size;

when the packet bytes remaining to transmit are greater than the maximum packet size, determining whether there is a message in progress;

if there is no message in progress, indicating the packet bytes remain as a first packet;

if there is a message in progress, indicating the packet bytes remain as a middle packet;

when the packet bytes remaining to transmit are not greater than the maximum packet size, also determining whether there is a message in progress;

if there is no message in progress, indicating the packet bytes remain as the only packet;

if there is a message in progress, indicating the packet bytes remain as a last packet; and determining if a Read, Write, or Send request with or without Immediate Data is associated with the packet bytes remain, and generating the OpCode based on the Read, Write, or Send request with or without Immediate Data associated with the packet bytes.

41. The host-fabric adapter as claimed in claim 40, wherein said Transmitter Header Hardware Assist (HWA) Mechanism computes the Length of a data packet simultaneously with computation of the OpCode by:

determining if the packet bytes remaining to transmit are greater than a maximum transfer size, after the packet bytes remaining to transmit are loaded;

if the packet bytes remaining to transmit are greater than the maximum transfer size, indicating that the Length equals to the maximum transfer size; and if the packet bytes remaining to transmit are not greater than the maximum transfer size, indicating that the Length equals to the packet bytes remain.

42. The host-fabric adapter as claimed in claim 41, wherein said OpCode and Length fields of a data packet are subsequently loaded into a packet buffer for packet construction with other header information before said data packet is scheduled for transmission, via the serial interface.

43. The host-fabric adapter as claimed in claim 28, wherein said host interface, said serial interface and said Micro-Engine (ME) are configured in accordance with the "*Virtual Interface (VI) Architecture Specification*", the "*Next Generation Input/Output (NGIO) Specification*" and the "*InfiniBand™ Specification*".

\* \* \* \* \*

UNITED STATES PATENT AND TRADEMARK OFFICE
CERTIFICATE OF CORRECTION

PATENT NO. : 7,107,359 B1
APPLICATION NO. : 09/698188
DATED : September 12, 2006
INVENTOR(S) : Burton et al.

It is certified that error appears in the above-identified patent and that said Letters Patent is hereby corrected as shown below:

In column 31, line 10, in Claim 13, delete "assemble" and insert -- assembled --, therefor.

In column 32, line 58, in Claim 22, delete "assemble" and insert -- assembled --, therefor.

In column 34, line 51, in Claim 32, delete "indicate" and insert -- indication --, therefor.

In column 35, line 45, in Claim 38, delete "assemble" and insert -- assembled --, therefor.

Signed and Sealed this

Twenty-sixth Day of December, 2006

JON W. DUDAS
*Director of the United States Patent and Trademark Office*